(12) United States Patent
Sun et al.

(10) Patent No.: US 11,632,304 B2
(45) Date of Patent: Apr. 18, 2023

(54) METHODS AND SYSTEMS FOR CHARACTERIZING COMPUTING SYSTEM PERFORMANCE USING PEER-DERIVED PERFORMANCE SEVERITY AND SYMPTOM SEVERITY MODELS

(71) Applicant: HEWLETT PACKARD ENTERPRISE DEVELOPMENT LP, Houston, TX (US)

(72) Inventors: Guoli Sun, Sunnyvale, CA (US); David Nellinger Adamson, San Mateo, CA (US); Gurunatha Karaje, Santa Clara, CA (US); Vladimir Semitchev, Cary, NC (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1696 days.

(21) Appl. No.: 15/339,341

(22) Filed: Oct. 31, 2016

(65) Prior Publication Data

US 2018/0123931 A1 May 3, 2018

(51) Int. Cl.
*H04L 41/14* (2022.01)
*H04L 43/16* (2022.01)
(Continued)

(52) U.S. Cl.
CPC .......... *H04L 41/145* (2013.01); *G06F 11/34* (2013.01); *H04L 43/0852* (2013.01);
(Continued)

(58) Field of Classification Search
CPC .............. G06F 12/00; G06F 17/30312; G06F 17/30864; G06F 17/302; H04L 43/0852; H04L 12/26
See application file for complete search history.

(56) References Cited

U.S. PATENT DOCUMENTS 8,688,878 B1 * 4/2014 Dolan ................... G06F 3/0653
710/33
8,832,330 B1 * 9/2014 Lancaster ........... G06F 11/3452
710/18
(Continued)

FOREIGN PATENT DOCUMENTS

EP 2026184 A1 * 2/2009 .......... G06F 11/1456

Primary Examiner — Kamal B Divecha
Assistant Examiner — Eui H Kim
(74) Attorney, Agent, or Firm — Trop, Pruner & Hu, P.C.

(57) ABSTRACT

An assessment of computing system performance may include evaluating, within a time window, the average latency of operations of a certain type and size with respect to a peer performance model constructed for operations of the same type and size. Such evaluation may result in the determination of a peer performance score. The peer performance score may be used to label performance characteristics of the computing system that are measured within the same time window. A library of such performance characteristics labeled with respective peer performance scores may be constructed by examining multiple computing systems, and such library may be used to construct one or more symptom models. Each symptom model may map a performance characteristic to a symptom severity score, which indicates the severity of a symptom of the computing system.

21 Claims, 26 Drawing Sheets

(51) Int. Cl.
*G06F 11/34* (2006.01)
*H04L 43/0852* (2022.01)
*H04L 43/0817* (2022.01)

(52) U.S. Cl.
CPC .......... *H04L 43/16* (2013.01); *G06F 11/3419* (2013.01); *G06F 11/3452* (2013.01); *H04L 43/0817* (2013.01)

(56) References Cited

U.S. PATENT DOCUMENTS

| | | | |
|---|---|---|---|
| 9,098,412 B1* | 8/2015 | Marchant | G06F 11/30 |
| 9,348,619 B1* | 5/2016 | Lysaght | G06F 30/331 |
| 2008/0010555 A1* | 1/2008 | Emma | G06F 11/3423 |
| | | | 714/47.1 |
| 2010/0094592 A1 | 4/2010 | Cherkasova et al. | |
| 2010/0325314 A1* | 12/2010 | Onuki | G06F 11/3485 |
| | | | 710/5 |
| 2013/0173845 A1* | 7/2013 | Aslam | G06F 12/0871 |
| | | | 711/E12.008 |
| 2014/0122692 A1* | 5/2014 | Klein | G06F 15/173 |
| | | | 709/224 |
| 2014/0195868 A1* | 7/2014 | Hasegawa | G06F 11/076 |
| | | | 714/724 |
| 2014/0201425 A1* | 7/2014 | Clark | G06F 3/067 |
| | | | 711/103 |
| 2016/0078362 A1* | 3/2016 | Christodorescu | G06N 20/10 |
| | | | 706/12 |
| 2017/0090779 A1* | 3/2017 | Barzik | G06F 3/0605 |
| 2017/0115894 A1* | 4/2017 | Sterns | G06F 3/0635 |

* cited by examiner

1102

| System ID 101010 Meas Interval 2 | | Op Size (kB) | | | | | | | | | | |
|---|---|---|---|---|---|---|---|---|---|---|---|---|
| | | 0.5 | 1 | 2 | 4 | 8 | 16 | 32 | 64 | 128 | 256 | 512 |
| Op Type | nsRead | | | | 1.3ms av for 3 ops | | | | 1.3ms av for 3 ops | 2.1ms av for 2 ops | | |
| | seqRead | | | | 1.3ms av for 3 ops | | | | 1.2ms av for 1 ops | 4.1ms av for 2 ops | | |
| | write | | | | 1.1ms av for 10 ops | | | | 1.7ms av for 12 ops | 3.1ms av for 15 ops | | |

1104

| System ID 101010 Meas Interval 2 | | Op Size (kB) | | | | | | | | | | |
|---|---|---|---|---|---|---|---|---|---|---|---|---|
| | | 0.5 | 1 | 2 | 4 | 8 | 16 | 32 | 64 | 128 | 256 | 512 |
| Op Type | nsRead | | | | 0.82 | | | | 0.77 | 0.91 | | |
| | seqRead | | | | 0.81 | | | | 0.31 | 0.88 | | |
| | write | | | | 0.43 | | | | 0.51 | 0.65 | | |

Op Type Specific Peer Performance Score

→ 0.82
→ 0.75
→ 0.55

Overall Peer Performance Score 0.62

Fig. 11

Model Training

Model Application

METHODS AND SYSTEMS FOR CHARACTERIZING COMPUTING SYSTEM PERFORMANCE USING PEER-DERIVED PERFORMANCE SEVERITY AND SYMPTOM SEVERITY MODELS

FIELD OF THE INVENTION

The present invention relates to methods and systems for characterizing storage system performance (or more generally computing system performance) using a peer performance model, and further relates in one embodiment to additionally characterizing storage system performance using one or more symptom models.

BACKGROUND

One measure of storage system performance is latency (i.e., the time taken for a particular request to be serviced by a storage system). Latency that is introduced by a storage system, if of long enough duration, may cause, for example, a user to notice a delay in the loading of a webpage (in the case of read latency) or may cause, for example, a user to wait for files to be uploaded onto a Dropbox™ account (in the case of write latency). While latency may be one measure of storage system performance, latency may not always be the most informative measure of storage system performance.

SUMMARY OF THE INVENTION

In accordance with one embodiment, certain types of assessment in addition or alternative to latency are used to obtain a more informative assessment of storage system performance. The motivation for considering additional or alternative types of assessment is that latency is not always a good indicator of storage system performance. In some instances, variations in latency are not closely tied to the storage system itself, but rather are caused by variations in the input to the storage system (e.g., the type of an I/O request, also called the operation type; the size of an I/O request, also called the operation size; etc.). For a more informative assessment of storage system performance, these external sources of variations (i.e., variations external to the storage system) may be "normalized out" (e.g., by averaging over various operation sizes) or taken into account by comparing "like with like" (e.g., comparing operations of the same type and size).

One such assessment determined by way of the peer performance model (a.k.a., performance severity model) is the peer performance score (a.k.a., performance severity score). The peer performance score compares the average latency of particular operations of a storage system with the latency of similar operations (e.g., operations with the same operation type and operation size) from peer storage systems (i.e., performing a "like-to-like" comparison). Peer storage systems may refer strictly to storage systems other than the subject storage system, or may broadly refer to a collection of storage systems including the subject storage system. In one embodiment, the peer performance score is a percentile (e.g., revealing that the average latency of particular operations from a certain storage system is greater than the latency experienced for 90% of similar operations from the peer storage systems) or a quantile (e.g., revealing that the average latency of particular operations from a certain storage system is greater than the latency experienced for 25% of similar operations from the peer storage systems, but is less than the latency experienced for 50% of similar operations from the peer storage systems). It is noted that peer performance scores may correlate better than latency measurements to the frequency of customer performance-related support cases, making peer performance scores, in some instances, a better indicator of storage system performance than latency measurements.

Another such assessment determined by way of the symptom model (a.k.a., symptom severity model) is an assessment of normal or poor performance (or other assessment with more granular outcomes) with respect to a performance characteristic other than latency (e.g., a non-sequential cache miss percentage, a prefetch miss percentage, a CPU busy percentage, a hard disk drive busy percentage, a solid state drive busy percentage or a sequential cache miss percentage). In a symptom model with binary output, the performance characteristic may be compared to a threshold that delineates normal performance from poor performance. The threshold may be part of a "symptom model" and any resulting assessment that deviates from normal performance (e.g., poor performance) may reveal a "symptom" of the storage system (e.g., a high sequential cache miss percentage). In a symptom model with more granular outcomes, the performance characteristic may be provided as input to a scoring function that generates a value indicative of the severity of a symptom of the storage system. The scoring function may generate a discrete set of outputs (e.g., excellent, good, average, below-average, poor) or may generate continuous valued outputs (e.g., a range of values from 0-100). The creation of symptom models may involve the selection of types of performance characteristics that are good indicators of storage system performance, and the determination of a threshold or scoring function for each of the selected performance characteristic types.

The presence/absence and/or the severity of a plurality of symptoms may be assessed (via the plurality of symptom models), and such assessment of symptoms (i.e., also called a signature) may be provided to a diagnosis model, which in turn deduces one or more underlying causes for the symptoms (i.e., provides a diagnosis for the observed symptoms). In one embodiment, the diagnosis may be expressed as a conditional probability (e.g., P(write buffer too small|symptom_severity_score_1=10, symptom_severity_score_2=5) =0.7). The diagnosis model may be human-curated (based on selected probability thresholds), or trained with a supervised machine learning algorithm (or other statistical learning theory techniques).

In accordance with one embodiment, an analysis server may for each of a plurality of measurement intervals and for each of a plurality of computing systems, determine operation information describing a plurality of operations that are executed over the measurement interval by the computing system. The plurality of operations may be characterized by a plurality of operation sizes and a plurality of operation types. The operation information may include an operation count and an average operation latency for each group of the operations that share a common operation size and operation type. The analysis server may further receive performance characteristics describing a state of the computing system during the measurement interval. The analysis server may further store the operation information and performance characteristics with an interval identifier of the corresponding measurement interval and a system identifier of the corresponding computing system, thereby forming a correspondence between the operation information and the performance characteristics that share a common measurement interval and relate to a common computing system. The forming of the correspondence may comprise configuring a memory according to a logical table, said logical table including a plurality of logical rows and columns. The operation information, the performance characteristics, the interval identifier and the system identifier may be stored in one of the logical rows.

These and other embodiments of the invention are more fully described in association with the drawings below.

BRIEF DESCRIPTION OF THE DRAWINGS

FIG. 11 depicts exemplary intermediate values that are calculated in the process of determining the various peer performance scores, according to one embodiment.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the sequence diagrams each present a series of steps in a certain order, the order of some of the steps may be changed.

Figure 1:
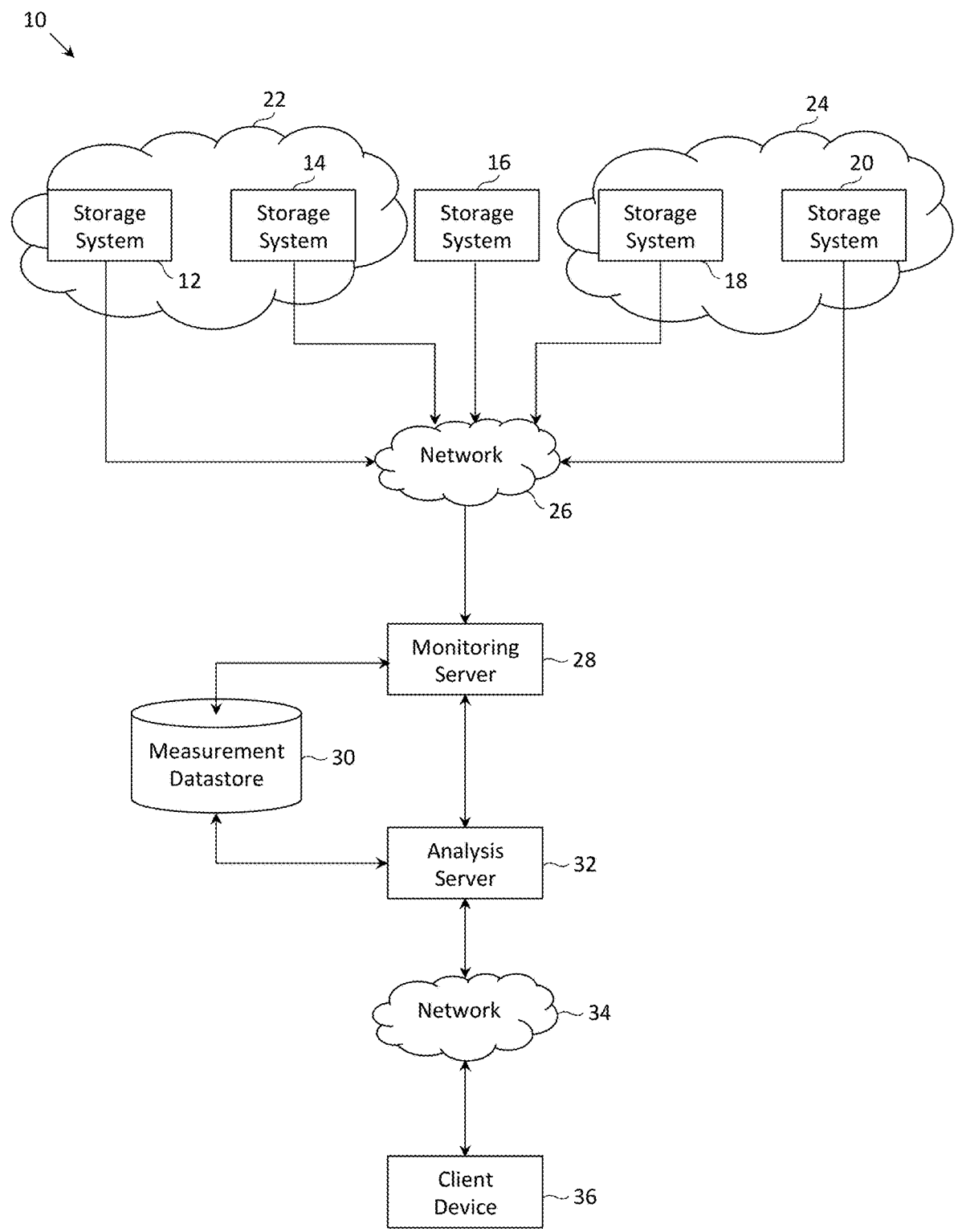
FIG. 1 depicts a system diagram in which a plurality of storage systems are configured to send sensor measurements to a monitoring/analysis server, which stores and analyzes the sensor measurements, according to one embodiment.

FIG. 1 depicts an environment 10 within which embodiments of the present invention may be instantiated. In environment 10, a number of storage systems (12, 14, 16, 18, 20) may be communicatively coupled with monitoring server 28 via network 26. Storage systems 12 and 14 may belong to enterprise 22, and storage systems 18 and 20 may belong to enterprise 24. It is also possible for components of a single storage system to be distributed across multiple enterprises. Network 26 may be any form of communications means and, in some cases, may be individual communications links, or one or more communications networks, including private networks, public networks and/or virtual private networks over public networks.

Each of the storage systems may be instrumented with a number of sensors that measure one or more performance characteristics associated with components and/or processes of the storage system. The performance characteristics may include a non-sequential cache miss percentage, a prefetch miss percentage, a CPU busy percentage, a hard disk drive busy percentage, a solid state drive busy percentage, and a sequential cache miss percentage among many other performance characteristics. The sensors may also measure the latency associated with each storage system, the latency being a measure of how long it takes a request (e.g., read or write request) to be serviced by a storage system. Measurements may be taken on a periodic basis (e.g., every second, every minute, every 5 minutes, etc.) or recorded for every operation and reported periodically such that a time series of measurements may be generated by each sensor. In one embodiment, measurements may be transmitted in real-time from each of the storage systems to monitoring server 28, while in another embodiment, measurements may be stored locally at each storage system, before being periodically transmitted in batches from each storage system to monitoring server 28 (e.g., once every hour, once every day, etc.) so that measurements do not constantly flood network 26. A large quantity of measurements may be taken at each storage system. In one embodiment, approximately 30 million measurements are transmitted from each storage system to monitoring server 28 every day.

Upon receiving the sensor measurements, monitoring server 28 may store the measurements in measurement datastore 30, which is accessible to analysis server 32. Analysis server 32 may analyze the measurements associated with each of the storage systems in order to assess the performance of one storage system relative to the performance of other storage systems (e.g., determine peer performance scores). Further, analysis server 32 may analyze the measurements associated with each of the storage systems in order to construct one or more symptom models, and evaluate the measurements with respect to each of the symptom models to determine the presence or absence of symptoms (or more generally, the severity of symptoms). Further, analysis server 32 may determine one or more diagnoses in response to the presence or absence (or severity) of the symptoms, and a treatment plan (e.g., software or hardware upgrade) to address each diagnosis. While monitoring server 28 and analysis server 32 are depicted as separate components in the embodiment of FIG. 1, monitoring server 28 and analysis server 32 could, in another embodiment, be configured as a single component. Alternatively, monitoring server 28 and analysis server 32 may each be constructed as a network-connected cluster of servers.

The determined peer performance scores, presence or absence of symptoms, diagnoses, treatment plans or other analysis may be transmitted from analysis server 32 to client device 36 via network 34. Similar to network 26, network 34 may be any form of communications means and, in some cases, may be individual communications links, or one or more communications networks, including private networks, public networks and/or virtual private networks over public networks. The analysis may be viewed on a display device of client device 36, printed by a printer of client device 36, etc. In another embodiment, the analysis may be directly communicated to a person by the analysis server (e.g., via a display or printer of the analysis server) without the need for client devices.

Figure 2:
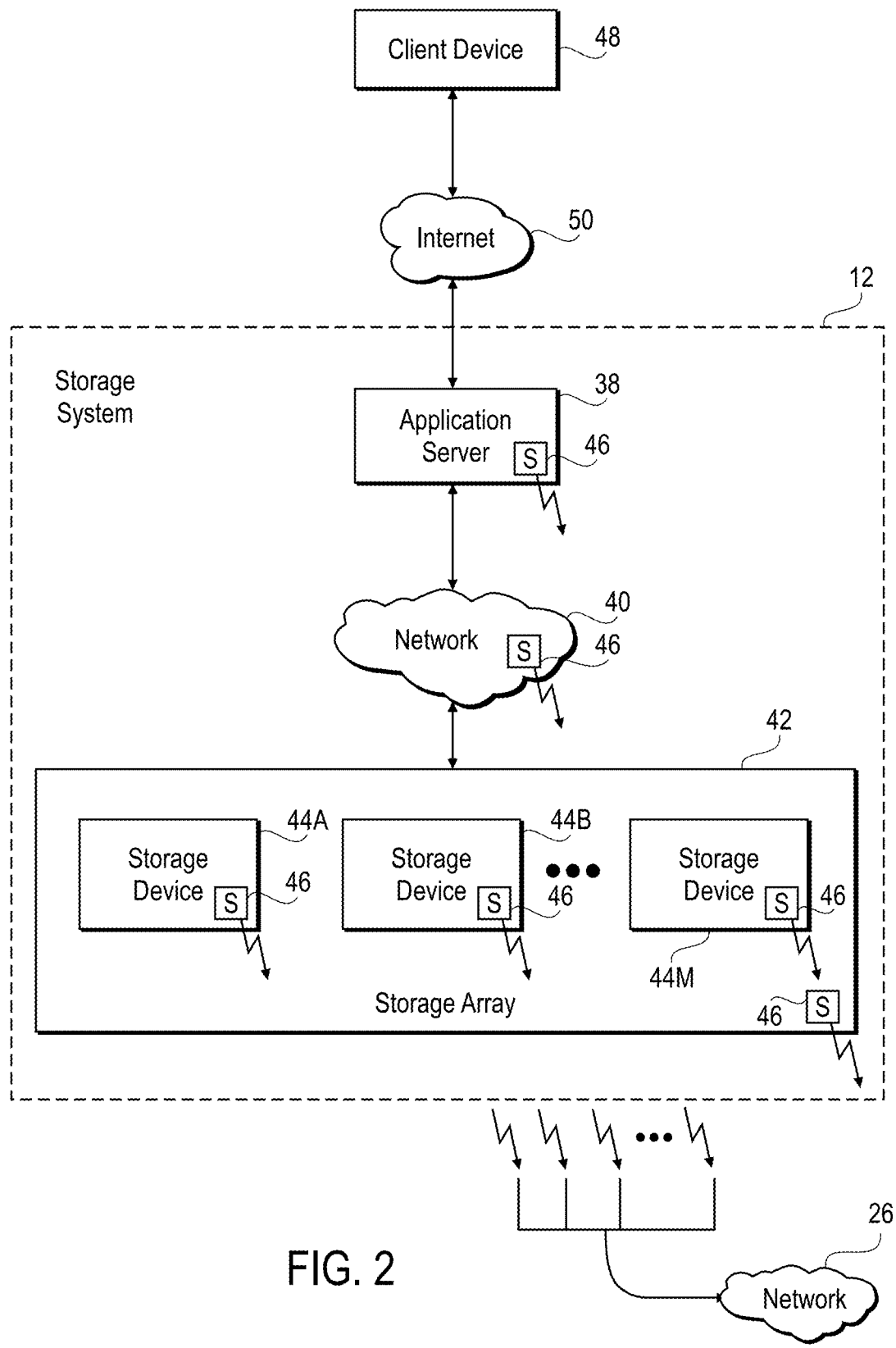
FIG. 2 depicts a storage system communicatively coupled with a client device, according to one embodiment.

FIG. 2 depicts one embodiment of storage system 12, including an application server 38 interfaced to storage array 42 via network 40. Examples of application server 38 include a file server, an e-mail server, a database manager, and a virtual machine. Examples of a storage array include an iSCSI (Internet Small Computer System Interface) storage array, a particular iSCSI storage array being a Nimble™ storage array manufactured by Nimble Storage™ of San Jose, Calif. Similar to network 26, network 40 may be any form of communications means and, in some cases, may be individual communications links, or one or more communications networks, including private networks, public networks and/or virtual private networks over public networks. Network 40 may also include one or more routers, switches, etc. Storage array 42 may include a plurality of storage devices 44A, 44B . . . 44M, including solid-state storage devices (e.g., flash-memory based devices), disk storage devices, etc. More specifically, storage system 12 may be an all-flash system (e.g., including only solid-state storage devices) or may be a hybrid system (e.g., including solid-state storage devices and disk storage devices). Storage system 12 may be interfaced with one or more client devices 48 through the Internet 50 or other communication network.

As depicted in FIG. 2, the storage system may be instrumented with one or more sensors 46 (including counters) which enable the activity of various processes and/or components to be measured. For instance, a sensor may count the number of cache misses that occurs every minute. In one embodiment, sensors may only be instrumented on components of storage array 42, while in other embodiments, sensors may be instrumented on application server 38 and network 40 as well. As previously described, such sensor measurements may be temporarily stored at storage system 12, before being transmitted to monitoring server 28 via network 26.

In the context of FIG. 2, read latency might refer to the time which elapses from application server 38 receiving a request for data, application server 38 communicating the request to storage array 42, storage array 42 reading the requested data from one or more of its storage devices 44A-44M, storage array 42 communicating the data to application server 38, to application server 38 finally responding to the request with the desired data. Write latency might refer to the time which elapses from application server 38 receiving a request to store data, application server 38 transmitting the data to storage array 42, storage array 42 writing the data to one or more storage devices 44A-44M, and to application server 38 finally receiving an acknowledgement from storage array 42 notifying the data being successfully stored.

Figure 3:
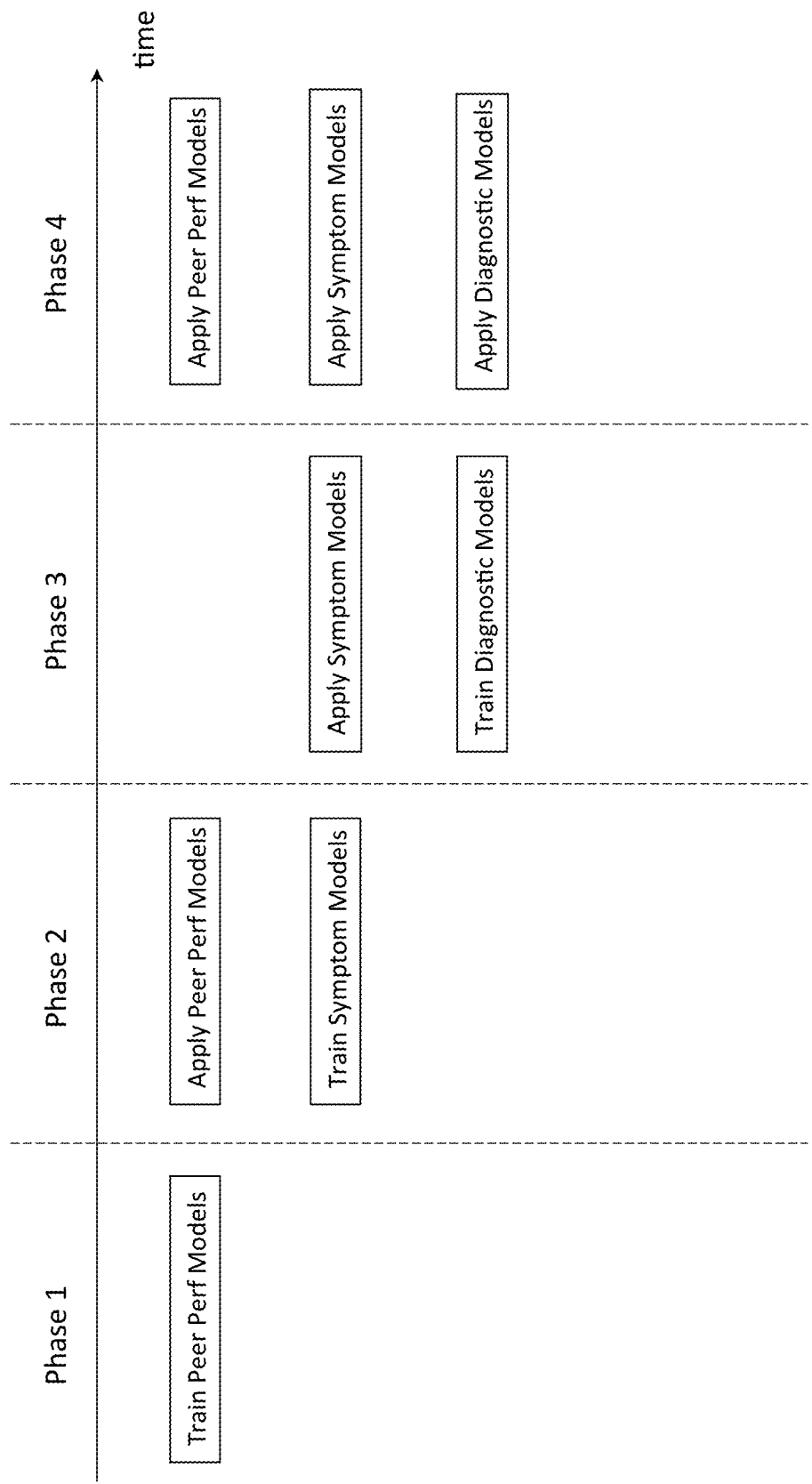
FIG. 3 depicts an overview of four phases of a process for characterizing the performance of a storage system, according to one embodiment.

FIG. 3 depicts an overview of four phases of a process for characterizing the performance of a storage system, according to one embodiment. In a first phase, peer performance models may be trained. Peer performance models and their training are described below in FIGS. 5-8. In a second phase, peer performance models may be applied, followed by the training of symptom models (e.g., the application of peer performance models is required in order to train the symptom models). The application of peer performance models and the training of symptom models are described below in FIGS. 9-16. In a third phase, symptom models may be applied, followed by the training of diagnostic models (e.g., the application of symptom models is required in order to train the diagnosis models). The application of symptom models and the training of diagnostic models are described below in FIGS. 17-18. In a fourth phase, once the models have all been trained (or trained to a certain degree), one or more of the peer performance models, symptom models and diagnostic models may be applied at the same time.

It is noted that there may be some temporal constraints associated with the ordering of the four phases, such that the first occurrence of each of the phases generally occurs in the order provided in FIG. 3. For instance, before the peer performance model is applied in phase 2, it needs to be trained at some point prior to phase 2 (e.g., in phase 1). Before the symptom model is applied in phase 3, it needs to be trained at some point prior to phase 3 (e.g., in phase 2). Likewise, before the diagnostic model is applied in phase 4, it needs to be trained at some point prior to phase 4 (e.g., in phase 3). On the other hand, the four phases need not occur exactly in the order depicted in FIG. 3, and phases may be repeated. For instance, the following order of phases may occur: 1, 2, 1, 2, 3 and 4 (e.g., the peer performance model is trained, the symptom model is trained, then the peer performance model is further trained, then the symptom model is further trained, etc.) As another example, the following order of phases may occur: 1, 2, 3, 4, 2, 3 and 4.

Figure 4:
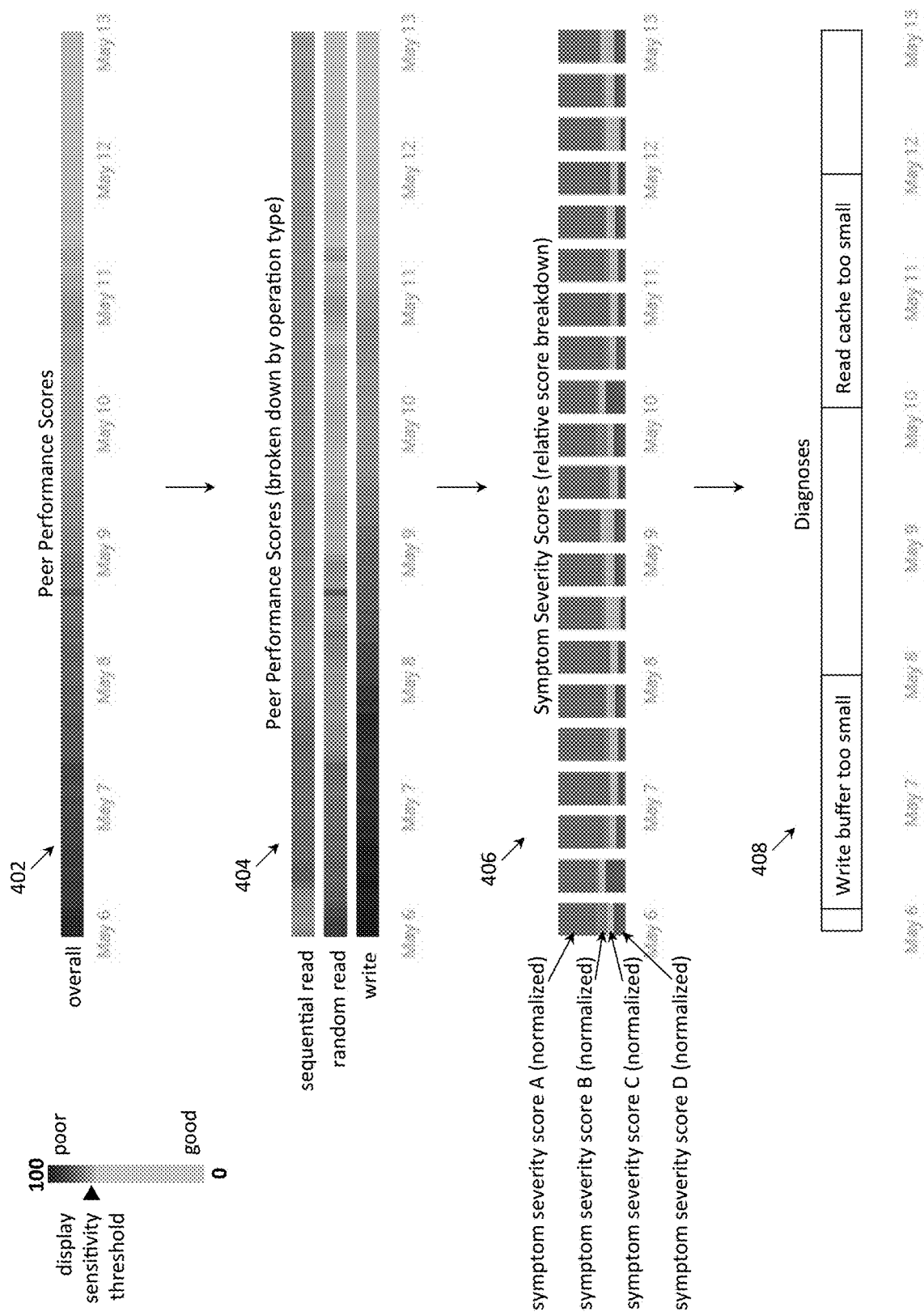
FIG. 4 depicts an exemplary presentation of peer performance scores, symptom severity scores and diagnoses, according to one embodiment.

FIG. 4 depicts an exemplary presentation of peer performance scores, symptom severity scores and diagnoses, according to one embodiment. If not already apparent, such information may be presented to an administrator of a storage system during phase 4 of the process depicted in FIG. 3. In one embodiment, the information of FIG. 4 may be presented in stages. First, a time sequence of peer performance scores (as indicated by ref num. 402) characterizing the performance of a storage system may be presented to an administrator via client device 36. As further described below, the peer performance score generally quantifies the performance (e.g., performance in terms of latency) relative to the performance of peer systems. In time sequence 402, darker shades of grey indicate a higher value of the peer performance score (associated with poor performance), while lighter shades of grey indicate a lower value of the peer performance score (associated with satisfactory performance). Therefore, time sequence 402 indicates that the performance of a storage system is relatively poor around May $6^{th}$, but that the performance gradually improves by May $13^{th}$. The particular presentation of peer performance scores in grey scale is, of course, exemplary. In another embodiment, poor performance could be indicated in red (or other color), while satisfactory performance could be indicated in grey (or other color).

Upon the user requesting a more granular presentation of the peer performance scores, the time sequence of peer performance scores may be presented for each operation type (as indicated by ref. num. 404). As further described below, during a measurement window, the storage system may process a plurality of operations of different types (e.g., sequential read, random read, write, etc.). In this more granular presentation of the peer performance scores, peer performance scores are separately computed and presented for operations of each type. Time sequence 404 reveals that the performance of write operations is generally worse than the performance of read operations from May $6^{th}$ to May $9^{th}$, while this disparity in performance is no longer present on May $11^{th}$ and onwards.

Upon the user requesting an analysis of the symptoms of the storage system, a time series of symptom severity scores (as indicated by ref. num. 406) may be presented. As further described below, various performance characteristics concerning that state of the storage system may be measured during each measurement window. By correlating the performance characteristics with peer performance scores measured for the same measurement window, various symptom models may be constructed. Each of these symptom models may generate a symptom severity score, indicating the severity of a particular performance characteristic (i.e., operating condition) for a particular operation type (i.e., type of workload). In time series 406, various symptom severity scores are presented in a relative manner (i.e., each band includes four sub-bands, and the height of each of the sub-bands indicates the magnitude of a symptom severity score relative to the other symptom severity scores). For example, time sequence 406 reveals that symptom A (as quantified by symptom severity score A) is the most problematic relative to the other symptoms (i.e., top sub-band generally having the greatest height over time).

Upon the user requesting one or more diagnoses of the storage system, a time sequence with one or more diagnoses (as indicated by ref num. 408) may be presented. As further described below, a diagnosis model may accept as input the symptom severity scores from time sequence 406 and provide one or more diagnoses of storage system performance over time. As shown by time sequence 408, the diagnoses may be provided for specific instances of times (e.g., diagnosis of "write buffer too small" from May $6^{th}$ to May $8^{th}$, and diagnosis of "read cache too small" from May $10^{th}$ to May $12^{th}$). Much of the description below explains the various algorithms and models used to generate the information (i.e., peer performance scores, symptom severity scores, and diagnoses) displayed in FIG. 4.

Figure 5:
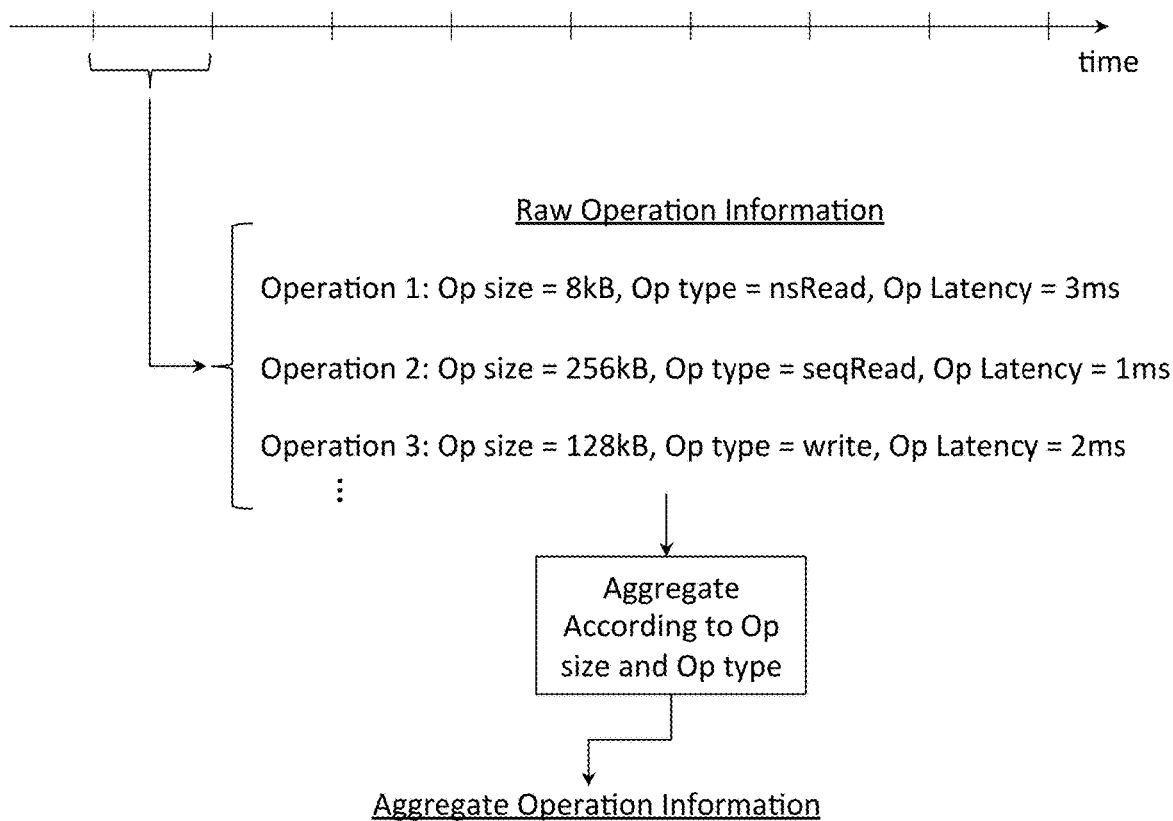
FIG. 5 depicts information describing a plurality of operations that are executed by a storage system over a time duration, according to one embodiment.

FIG. 5 depicts information describing a plurality of operations (e.g., I/O requests) that are executed by a storage system over a time duration (a.k.a., a measurement interval), according to one embodiment. The time duration may be a minute, or other duration of time. While operation information is depicted as being received for one duration of time in the example of FIG. 5, it is understood that operation information, more generally, may be received for successive durations of times (e.g., 12:00-12:01; 12:01-12:02; 12:02-12:03; etc.)

As a particular example, the operations may be performed by storage system 12, as the result of receiving read/write requests from client device 48. In turn, information regarding the operations (e.g., operation size, operation type and operation latency) may be received by monitoring server 28. Further, it is understood that such data collection may be similarly performed for one or more storage systems (e.g., one or more of storage systems 12, 14, 16, 18 and 20).

The information may include an operation size, operation type and operation latency associated with each of the operations. The operation size may refer to the size of the payload of the operation (e.g., size of file to be written, size of file to be read, etc.). The operation type may include a sequential read (e.g., a read operation that involves reading blocks that are located at contiguous physical addresses in the order of the physical addresses), a non-sequential read (e.g., a read operation that involves reading blocks that are located at non-contiguous physical addresses), a sequential write (e.g., a write operation that involves writing blocks to contiguous physical addresses in the order of the physical addresses), or a non-sequential write (e.g., a write operation that involves writing blocks to non-contiguous physical addresses). For simplicity, the remainder of the discussion will focus on sequential reads (abbreviated as "seqRead"), non-sequential reads (abbreviated as "nsRead") and writes (which will include both sequential and non-sequential writes). The operation latency (whether read latency or write latency) was described above with respect to FIG. 2.

FIG. 5 provides an example of the "raw" operation information that may be received by monitoring server 28. Information associated with the first three operations is depicted in FIG. 5, and an ellipsis indicates that there are many more operations that may occur over the time duration. For operation 1, the operation size is 8 kB, the operation type is "nsRead", and the operation latency is 3 ms. For operation 2, the operation size is 256 kB, the operation type is "seqRead", and the operation latency is 1 ms. For operation 3, the operation size is 128 kB, the operation type is "write", and the operation latency is 2 ms.

As shown in FIG. 5, the raw operation information may be aggregated by operation type and operation size to form "aggregated" operation information. For instance, an operation count and an average operation latency may be computed for each group of the operations with a certain operation size and type. As shown in the table of FIG. 5, there were 3 operations with an operation size of 8 kB and an operation type of "nsRead". The average latency for these 3 operations was calculated to be 3.2 ms. Further, the "aggregated" operation information may be labeled with an identifier of the storage system (e.g., System ID=101010) and an identifier of the measurement interval (e.g., measurement interval 1).

Figure 6:
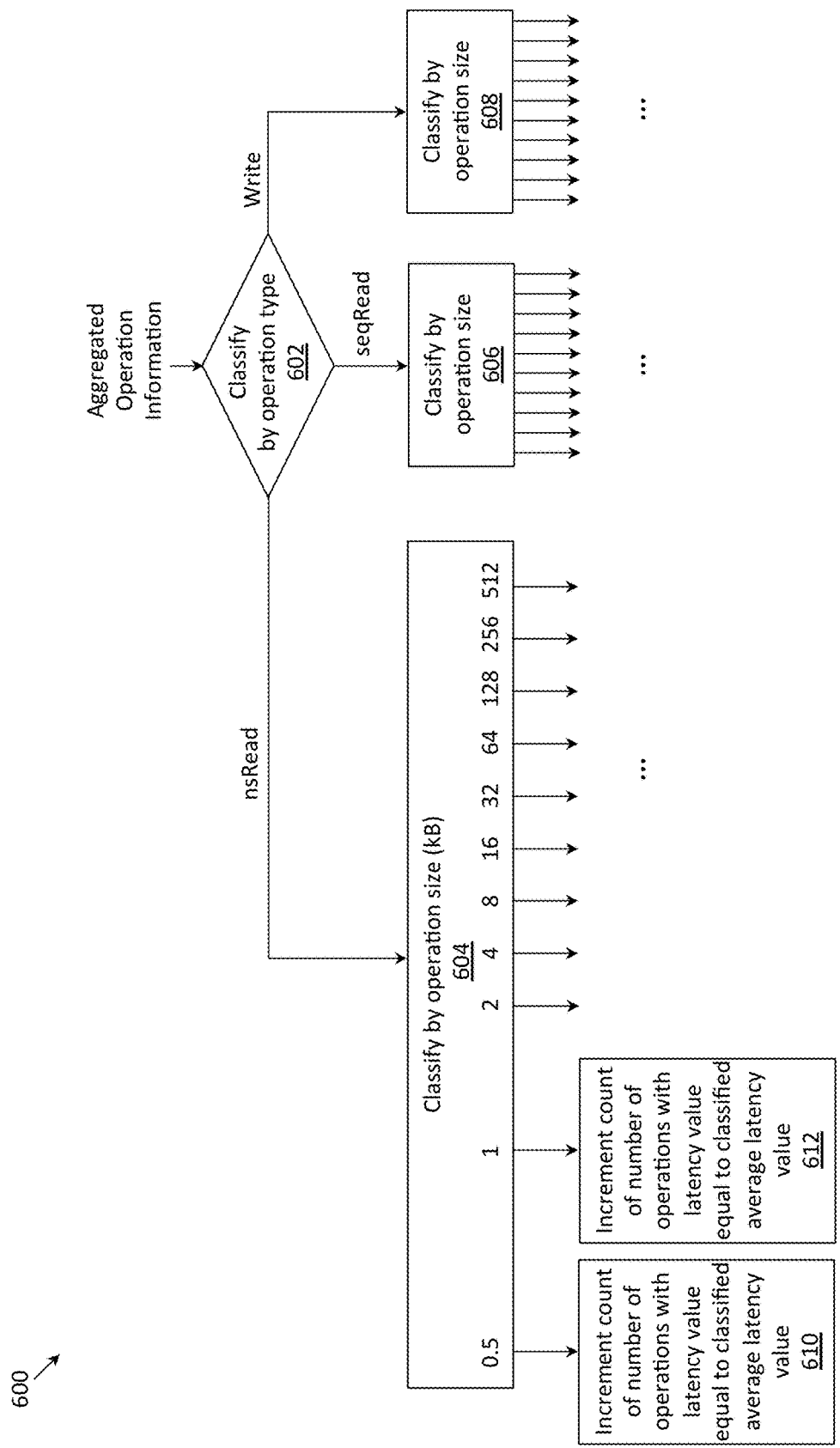
FIG. 6 depicts a flowchart for constructing and/or training a peer performance model corresponding to each of the operation types, according to one embodiment.

FIG. 6 depicts flowchart 600 for constructing and/or training a peer performance model corresponding to each of the operation types, in accordance with one embodiment. Before describing the process in detail, an overview of peer performance models is first provided. Each of the peer performance models may include a collection of latency distributions, and each of the latency distributions may correspond to a different operation size. A latency distribution may be formed by generating a histogram of average latency values (collected from a plurality storage systems), all of which correspond to operations of a specific operation type and operation size. A peer performance model allows a comparison of a storage system's performance (e.g., latency) relative to the performance of peer storage systems for the same operation type and operation size (essentially eliminating the variation in performance due to operation type and operation size from the comparison). In the case where peer storage systems include the subject storage system, the comparison may further include comparing the current performance of the subject storage system to the past performance of the subject storage system.

The input to flowchart 600 may include the operation information (i.e., the aggregated version thereof) discussed above with respect to FIG. 5 (e.g., an operation count and an average operation latency computed for groups of operations having the same size and type over a measurement interval), as well as the operation information from many other measurement intervals from the subject storage system and many other storage systems. The operation information may be classified by type (step 602) and size (steps 604, 606 and 608). Finally, a latency histogram corresponding to the classified type and size of the operation information may be updated (or constructed) to include the average latency of the classified operation information (steps 610 and 612, and similar steps denoted using ellipses).

For clarity of description, a particular traversal through flowchart 600 is described when the following operation information is received as input: 2 operations with an average latency of 1.0 ms for the operation type of seqRead and the operation size of 256 kB (i.e., example drawn from the table from FIG. 5). In step 602, the operation information is classified as seqRead. In step 606, the operation information is classified to have a size of 256 kB. Next, the count of the number of operations with an average latency value equal to 1.0 ms is incremented by 2 (such step being similar to steps 610 and 612) in the updating or construction of a latency histogram.

Figure 7:
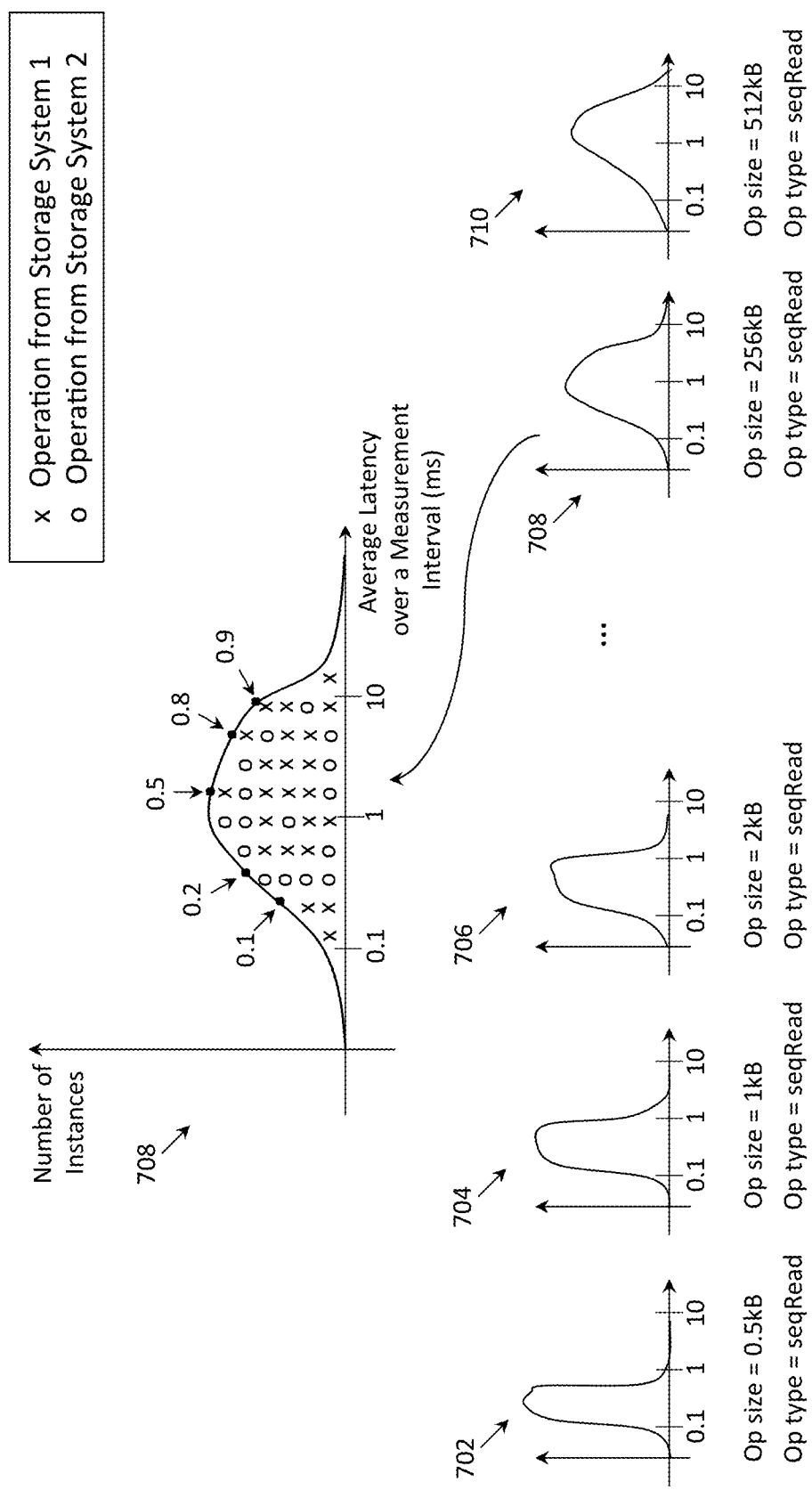
FIG. 7 depicts various latency distributions that correspond to different operation sizes in order to illustrate the construction of a peer performance model, according to one embodiment.

FIG. 7 depicts a plurality of latency histograms which are all part of a peer performance model for the operation type of seqRead. More specifically, FIG. 7 depicts histograms 702, 704, 706, 708 and 710 corresponding to operation sizes 0.5 kB, 1 kB, 2 kB, 256 kB and 512 kB, respectively, and all the histograms correspond to the operation type of seqRead. Histogram 708 corresponding to operation size of 256 kB is depicted in greater detail at the center of FIG. 7. The x-axis of histogram 708 is the average operation latency over a measurement window (in log scale), and the y-axis of histogram 708 is an operation count (in linear scale). An "x" and "o" represent an operation from storage system 1 and 2, respectively, having a particular average latency value. In practice, it is expected that the latency histograms will contain a count of operations from hundreds of distinct systems or more. As an example, for the operation type of seqRead, the operation size of 256 kB and the average latency value of 1.0 ms, there are 3 instances of such operations from storage system 1, and 3 instances of such operations from storage system 2.

To illustrate the updating of histogram 708, assume that the aggregate operation information of 2 operations with an average latency value of 1.0 ms for operation type of seqRead and operation size 256 kB was determined for storage system 1. Such aggregate operation information would contribute an additional two counts to histogram 708 at the average latency value of 1 ms, resulting in 5 "x's" and 3 "o's" at the average latency of 1.0 ms.

In the expanded version of histogram 708, percentiles are also depicted. The 0.1 (or $10^{th}$) percentile represents the latency value that is larger than 10% of the samples (or observed operations) in the histogram; the 0.2 (or $20^{th}$) percentile represents the latency value that is larger than 20% of the samples (or observed operations) in the histogram; and so on.

Figure 8:
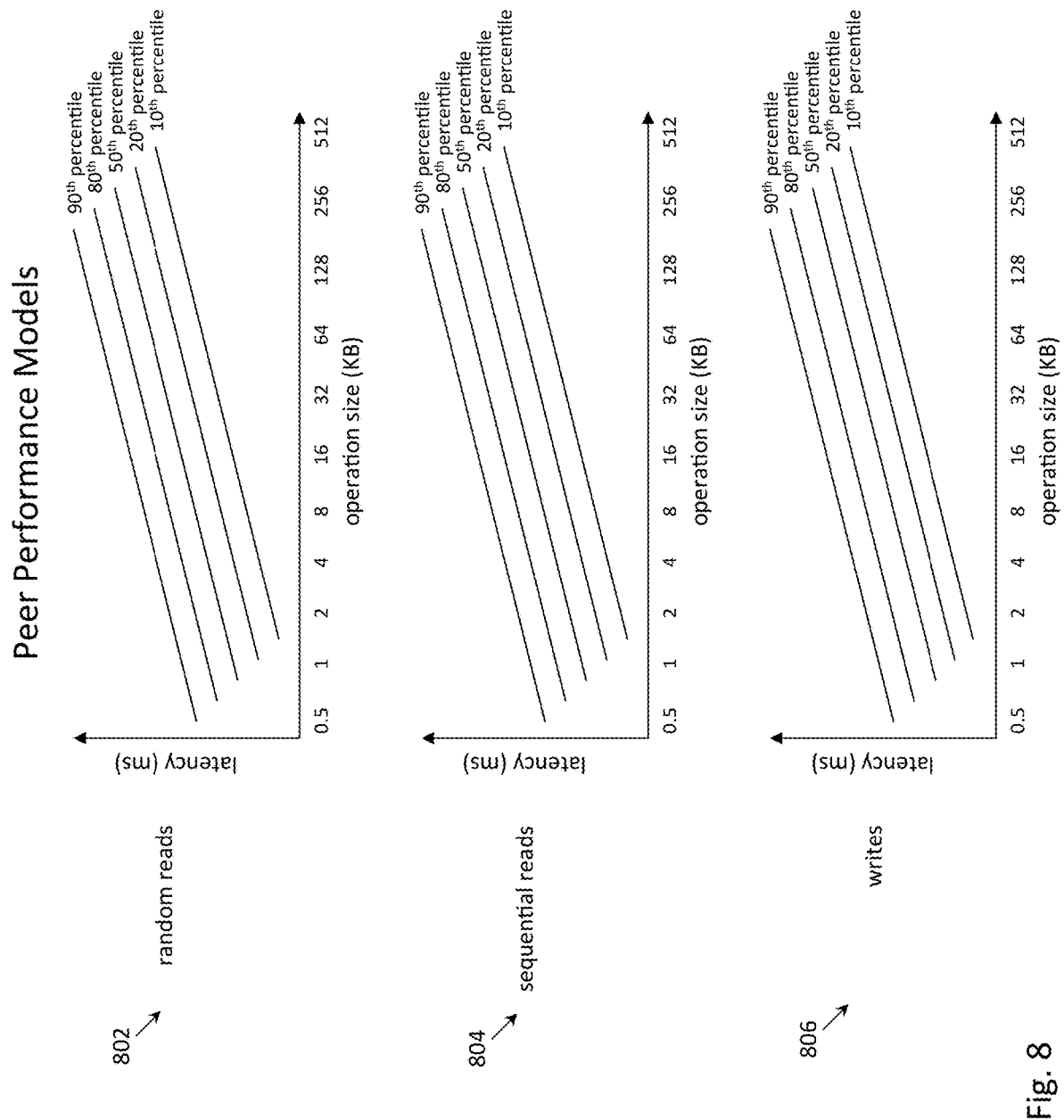
FIG. 8 depicts three exemplary peer performance models, one for the operation type "nsRead" (i.e., non-sequential read), one for the operation type "seqRead" (i.e., sequential read), and one for the operation type "write", according to one embodiment.

FIG. 8 depicts three exemplary peer performance models 802, 804 and 806, according to one embodiment. Peer performance model 802 is specific to the operation type of nsRead; peer performance model 804 is specific to the operation type of seqRead; and peer performance model 806 is specific to the operation type of write. Peer performance model 804 is a compact way to represent the histograms (or latency distributions) depicted in FIG. 7. The x-axis of the histograms is equivalent to the y-axis of peer performance model 802. The y-axis of the histograms is essentially the z-axis of peer performance model 802 (sticking out of the page). Rather than depicting a 3-D plot, contour lines defined by percentiles (i.e., the percentiles described in FIG. 7) have been depicted instead. For example, a "vertical cut" at the operation size of 256 kB for peer performance model 804 would correspond to histogram 708. One can observe that the latency values generally increase with increasing operation size (which is to be expected). While the present peer performance models have been constructed using latency distributions generated for particular operation types and operation sizes, peer performance models need not be limited to the metric of latency. In another embodiment, peer performance models could be constructed based on throughput distributions generated for particular operation types and operation sizes.

Figure 9:
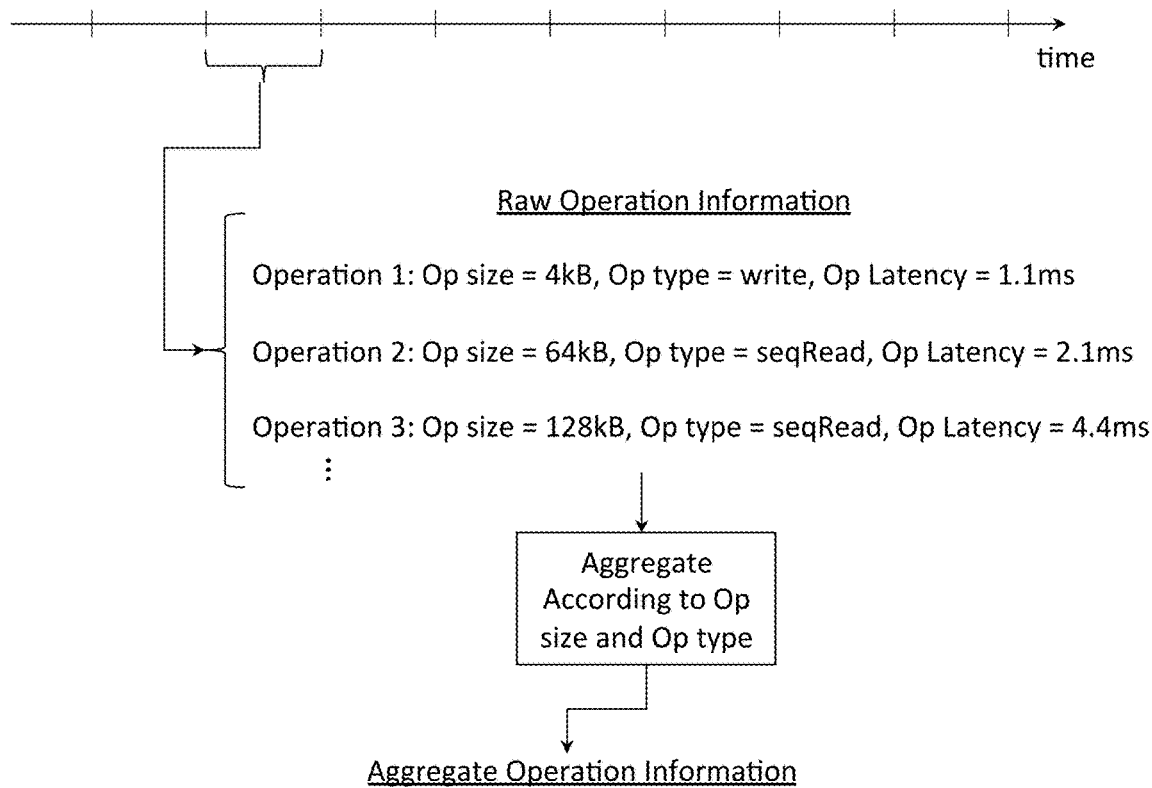
FIG. 9 depicts information describing a plurality of operations that are executed by a storage system over a time duration, according to one embodiment.
Figure 10:
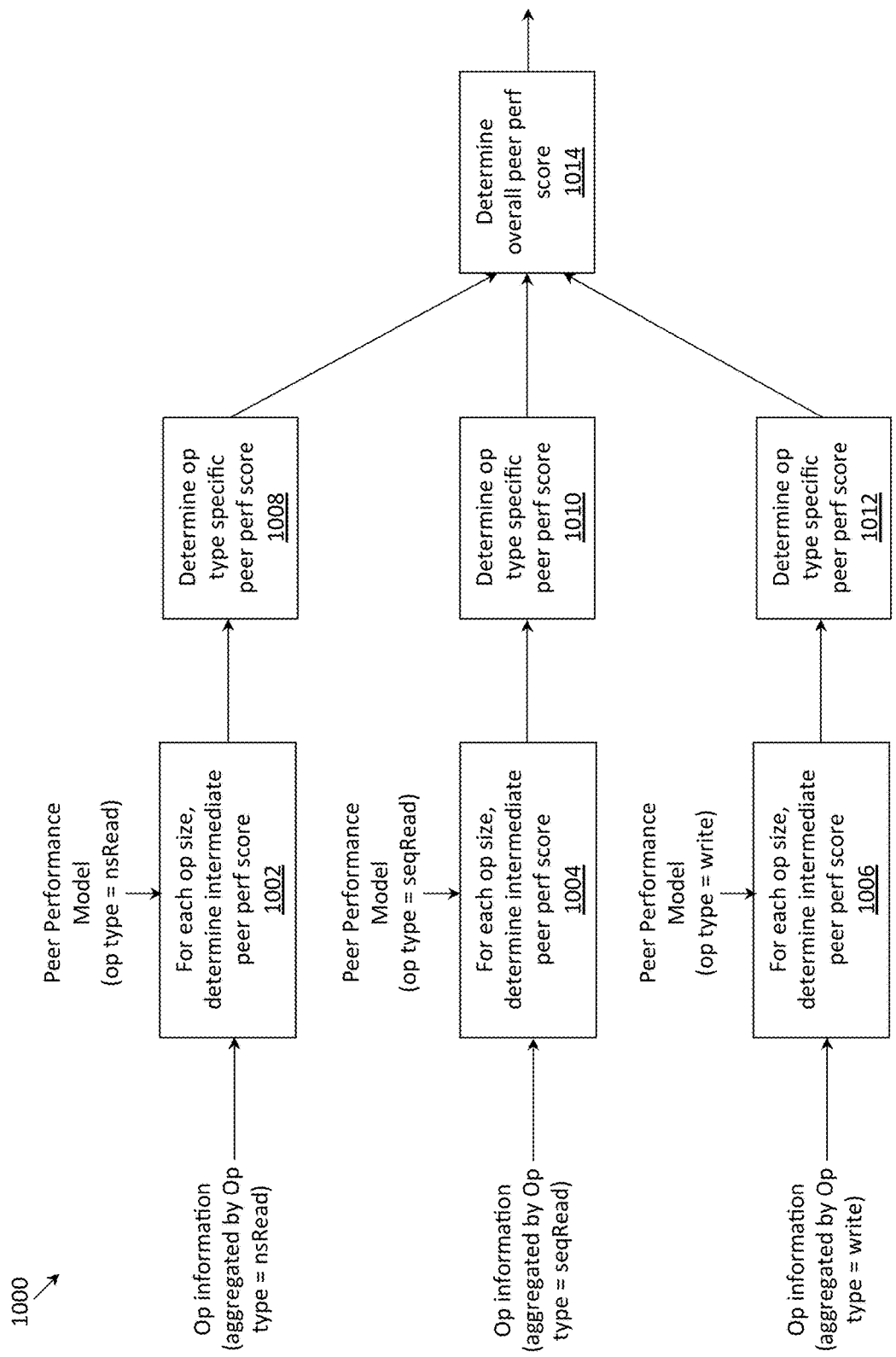
FIG. 10 depicts a flowchart for determining various peer performance scores, according to one embodiment.

FIGS. 9-11 illustrate a process for determining peer performance scores (i.e., applying the peer performance models), according to one embodiment. FIG. 9 depicts the input provided to the peer performance models in order to determine peer performance scores. The input includes aggregated operation information from a measurement interval. FIG. 9 and FIG. 5 are very similar except that the operation information is collected from different measurement intervals. In other words, operation information is collected from a first measurement interval to train the peer performance models, while operation information is collected from a second measurement interval to determine peer performance scores (i.e., "first" and "second" used to describe two separate, but not necessarily contiguous measurement intervals). Such technique seeks to reduce the problem known in statistics as "over-fitting", in which the model is "over-fit" to the training data, leading to poor predictive performance. In another embodiment, operation information from the same measurement interval could be used to both train a peer performance model and provided to the peer performance model as input, but this would not be as desirable as the earlier described embodiment.

FIG. 10 depicts flowchart 1000 for determining various peer performance scores, including intermediate peer performance scores (i.e., operation size and operation type specific peer performance scores), operation type specific peer performance scores (i.e., peer performance scores averaged over operation size) and an overall peer performance score (i.e., peer performance score averaged over both operation type and operation size). Step 1002 receives as input operation information specific to the operation type of nsRead, and a peer performance model constructed for the operation type of nsRead. Step 1002 determines an intermediate peer performance score for each operation size. A similar description applies to steps 1004 and 1006, except that step 1004 is specific to the operation type of seqRead and step 1006 is specific to the operation type of write.

Step 1008 receives an intermediate peer performance score for each operation size, and performs a weighted average of these intermediate peer performance scores (weighted by a count of the number of operations of each size for the operation type of nsRead) to generate a peer performance score specific to the operation type of nsRead. A similar description applies to steps 1010 and 1012, except that step 1010 is specific to the operation type of seqRead and step 1012 is specific to the operation type of write. Examples of such operation type specific peer performance scores were depicted as element 404 in FIG. 4.

Step 1014 receives operation type specific peer performance scores (e.g., one for the operation type of nsRead, one for the operation type of seqRead, one for the operation type of write). Step 1014 performs a weighted average of these operation specific peer performance scores (e.g., weighted by a count of the number of operations of each type over the measurement interval or weighted by the throughput of the operations of each type over the measurement interval) to generate an overall peer performance score. Examples of such overall peer performance scores were depicted as element 402 in FIG. 4.

To more easily understand flowchart 1000, FIG. 11 depicts exemplary input to flowchart 1000, as well as exemplary output from each of the steps of flowchart 1000. Table 1102 includes aggregate operation information (identical to the operation information depicted in the table of FIG. 9). More specifically, the top row of Table 1102 (i.e., corresponding to op type=nsRead) may be provided as input to step 1002; the middle row of Table 1102 (i.e., corresponding to op type=seqRead) may be provided as input to step 1004; the bottom row of Table 1102 (i.e., corresponding to op type=write) may be provided as input to step 1006.

Table 1104 includes intermediate peer performance scores that are determined by steps 1002, 1004 and 1006. More specifically, the top row of Table 1104 (i.e., corresponding to op type=nsRead) may be generated as the output from step 1002; the middle row of Table 1104 (i.e., corresponding to op type=seqRead) may be generated as the output from step 1004; the bottom row of Table 1104 (i.e., corresponding to op type=write) may be generated as the output from step 1006. As a specific example, the input of op size=4 kB and average latency=1.3 ms may be provided as input to peer performance model 802, which may return the intermediate peer performance score of 0.82.

Each row of Table 1104 (i.e., top, middle and bottom) may be provided as input to steps 1008, 1010 and 1012 to generate operation type specific peer performance scores. Exemplary operation type specific peer performance scores are depicted on the right side of Table 1104 (i.e., peer performance score of 0.7 for the operation type of nsRead; peer performance score of 0.3 for the operation type of seqRead; and peer performance score of 0.5 for the operation type of write). As a specific example, for the operation type of nsRead, the peer performance score may be calculated as $(0.82*3+0.77*3+0.91*2)/(3+3+2)=0.82$.

The operation type specific peer performance scores may be provided as input to step 1014, which generates an overall peer performance score. As a specific example, the overall peer performance score may be calculated as $(0.82*8+0.75*6+0.55*37)/(8+6+37)=0.62$, where total operation counts for each type of operation were used as weights.

FIGS. 12-16 illustrate a process to generate symptom models (a.k.a., symptom severity models). While the discussion so far has mostly focused on using operation information (and using that operation information to train and apply peer performance models), symptom models take into account a variety of characteristics of the storage system (e.g., non-sequential cache miss percentage, prefetch miss percentage, CPU busy percentage, HDD busy percentage, etc.) in addition to the operation information. These characteristics may be called performance characteristics, and the collection of performance characteristics may describe a state of the storage system.

In the training of symptom models, a correspondence may be established between operation information and performance characteristics that are measured for the same measurement interval and the same storage system. Peer performance scores (for each operation type) are then generated from the operation information. In turn, a correspondence is established between the peer performance scores (for each operation type) and the performance characteristics. A problem is encountered, in that peer performance scores are available at a finer granularity than the performance characteristics. A peer performance score may be available for each operation type, whereas performance characteristics may only be available for operations of all types aggregated over a measurement interval. To address this problem, an approximation is made to associate performance characteristics with one or more operation types. Afterwards, a correspondence is established between peer performance scores and performance characteristics for the same operation type. If a correlation exists between a group of performance characteristics of the same type and its corresponding peer performance scores (such analysis performed using data drawn from numerous measurement intervals and storage systems), that performance characteristic type is selected to form a symptom model which maps performance characteristics (of that type) to respective symptom scores (or symptom severity scores). Such process is now described in more detail below.

Figure 12:
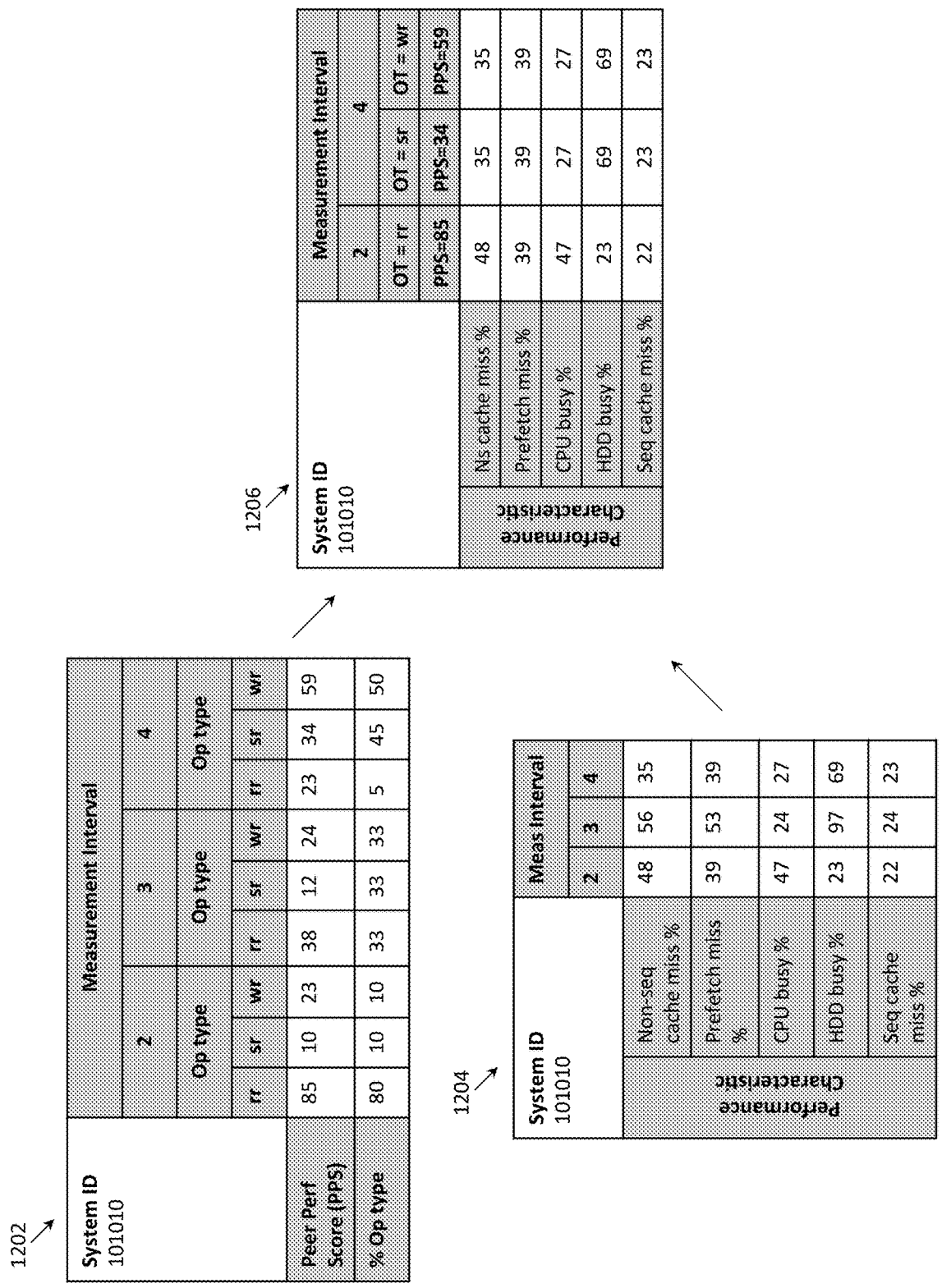
FIG. 12 depicts a first table with peer performance scores broken down by operation type for a plurality of measurement intervals, a second table with aggregate sensor measures for the plurality of measurement intervals, and a third table which forms an association between the information from the first table and the information from the second table, according to one embodiment.

FIG. 12 depicts three tables. Table 1202 contains information derived from operation information for each of several measurement intervals (for a specific computing system). Table 1204 contains performance characteristics measured from the same measurement intervals and computing system as Table 1202. Lastly, Table 1206 combines the information from Table 1202 and 1204 in a certain manner (described below).

In Table 1202, operation type specific peer performance scores are tabulated for each measurement interval. These operation type specific peer performance scores may be generated by steps 1008, 1010 and 1012 from FIG. 10. "rr" abbreviates the operation type "random read" or "nsRead"; "sr" abbreviates the operation type "sequential read" or "seqRead" and "wr" abbreviates the operation type "write". Table 1202 additionally tabulated the "% Op type" or the percentage of operations over the measurement interval by type (e.g., either based on operation count or throughput). As a specific example, in the second measurement interval, the peer performance scores were 85, 10 and 23 for the operation types random read, sequential read, and write, respectively. (It is understood that a peer performance score of 85 is a shorthand for 0.85, and so on.) Further, in the second measurement interval, the proportion of operations in terms of operation type (i.e., "% Op type") was 80% random reads, 10% sequential reads and 10% writes. Lastly, it is noted that the information present in Table 1202 is labeled with a system ID (i.e., 101010), labeling the storage system from which the information was measured or derived.

In Table 1204, performance characteristics are tabulated for each measurement interval. Performance characteristics may include a non-sequential cache miss percentage, a prefetch miss percentage, a CPU busy percentage, a hard disk drive busy percentage and a sequential cache miss percentage (each of the performance characteristics averaged over the measurement interval). As a specific example, in the second measurement interval, the non-sequential cache miss percentage was 48%, the prefetch miss percentage was 39%, the CPU busy percentage was 47%, the hard disk drive percentage was 23% and the sequential cache miss percentage was 22%. Similar to Table 1202, the information present in Table 1204 is labeled with system ID 101010, which allows analysis server 32 to determine that the information from Tables 1202 and 1204 correspond to the same storage system.

As noted above, a problem exists in that the information from Tables 1202 and 1204 exhibit different levels of granularity. The peer performance scores in Table 1202 are broken down by operation type, whereas this level of granularity is not available for the performance characteristics. In one embodiment, an approximation is made to assign the performance characteristics from each measurement interval to the one or more operation types with a "% Op type" greater than 40% (or other percentage) in the corresponding measurement interval. If none of the operation types account for more than 40% (or other percentage) of the operations (or throughput) in a measurement interval, no correspondence may be made between the information of Tables 1202 and 1204. Taking the second measurement interval as a specific example, 80% of the operations (or throughput) were random read operations, 10% of the operations (or throughput) were sequential read operations, and 10% of the operations (or throughput) were write operations. Since the percentage of random read operations was greater than 40%, the performance characteristics from the first measurement interval may be assigned to the operation type of random reads. Such assignment allows a correspondence to be established between the performance characteristics measured in the second measurement interval and the peer performance score of 85 determined for the operation type of random reads for the same measurement interval. Such correspondence is captured in the first column of Table 1206.

Taking the third measurement interval as another example, 33% of the operations (or throughput) were random reads, 33% of the operations (or throughput) were sequential reads and 33% of the operations (or throughput) were writes. Since none of the percentages exceeded 40%, no correspondence may be made between the data from the third measurement interval. Accordingly, the data from the third measurement interval is not present in Table 1206.

Taking the fourth measurement interval as another example, 5% of the operations (or throughput) were random read operations, 45% of the operations (or throughput) were sequential read operations, and 50% of the operations (or throughput) were write operations. Since the percentage of sequential read operations and the percentage of write operation were each greater than 40%, the performance characteristics from the fourth measurement interval may be assigned to both the operation types of sequential reads and writes. Such correspondences are captured in the second and third columns of Table 1206.

It is noted that another way to address the difference in granularity between the data in Tables 1202 and Tables 1204 would be to make the data in Table 1202 less granular (i.e., use the output of step 1014 from FIG. 10 which averages out the operation type). Such approach could be employed in an alternative embodiment.

Figure 13:
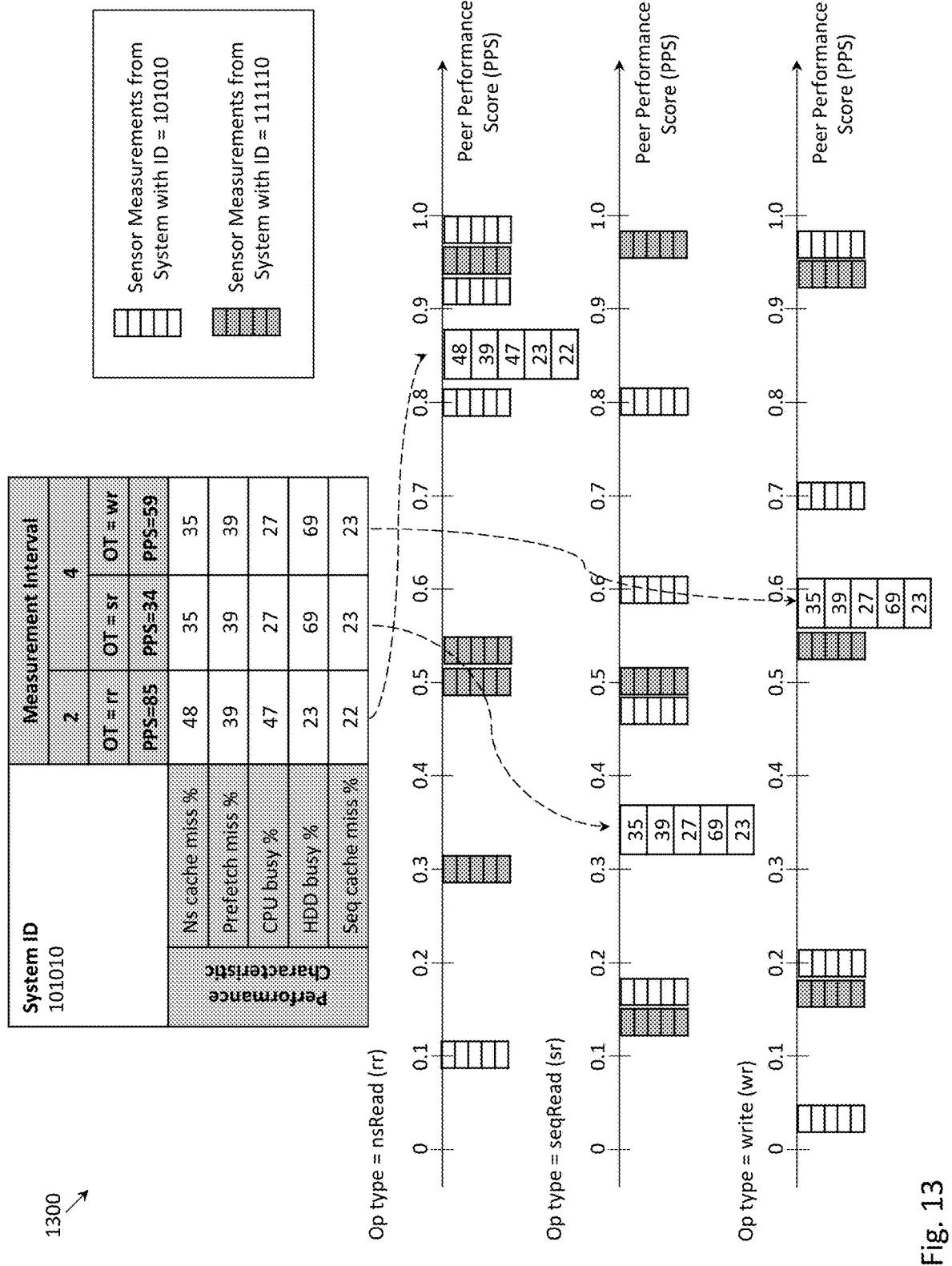
FIG. 13 depicts a diagram that presents performance characteristics organized by their respective peer performance scores and representative operation types, according to one embodiment.

FIG. 13 depicts visualization 1300 of the data captured in Table 1206. It is noted that the visualization is provided as a means to better appreciate and explain the data of Table 1206, and may not necessarily be part of an implementation of the invention. As may be apparent, the performance characteristics from each measurement interval may be tagged with one or more performance scores and operation types. Visualization 1300 spatially arranges the data captured in Table 1206. The first column of Table 1206 is spatially arranged at a location corresponding to the operation type of random read and a peer performance score of 85 (or equivalently 0.85). The second column of Table 1206 is spatially arranged at a location corresponding to the operation type of sequential read and a peer performance score of 34 (or equivalently 0.34). Similarly, the third column of Table 1206 is spatially arranged at a location corresponding to the operation type of write and a peer performance score of 59 (or equivalently 0.59). FIG. 13 illustrates that performance characteristics from various other measurement intervals and storage systems may be spatially arranged in a similar manner. The resulting collection of data may be interpreted as a library of performance characteristics organized by peer performance scores and operation types.

Figure 14:
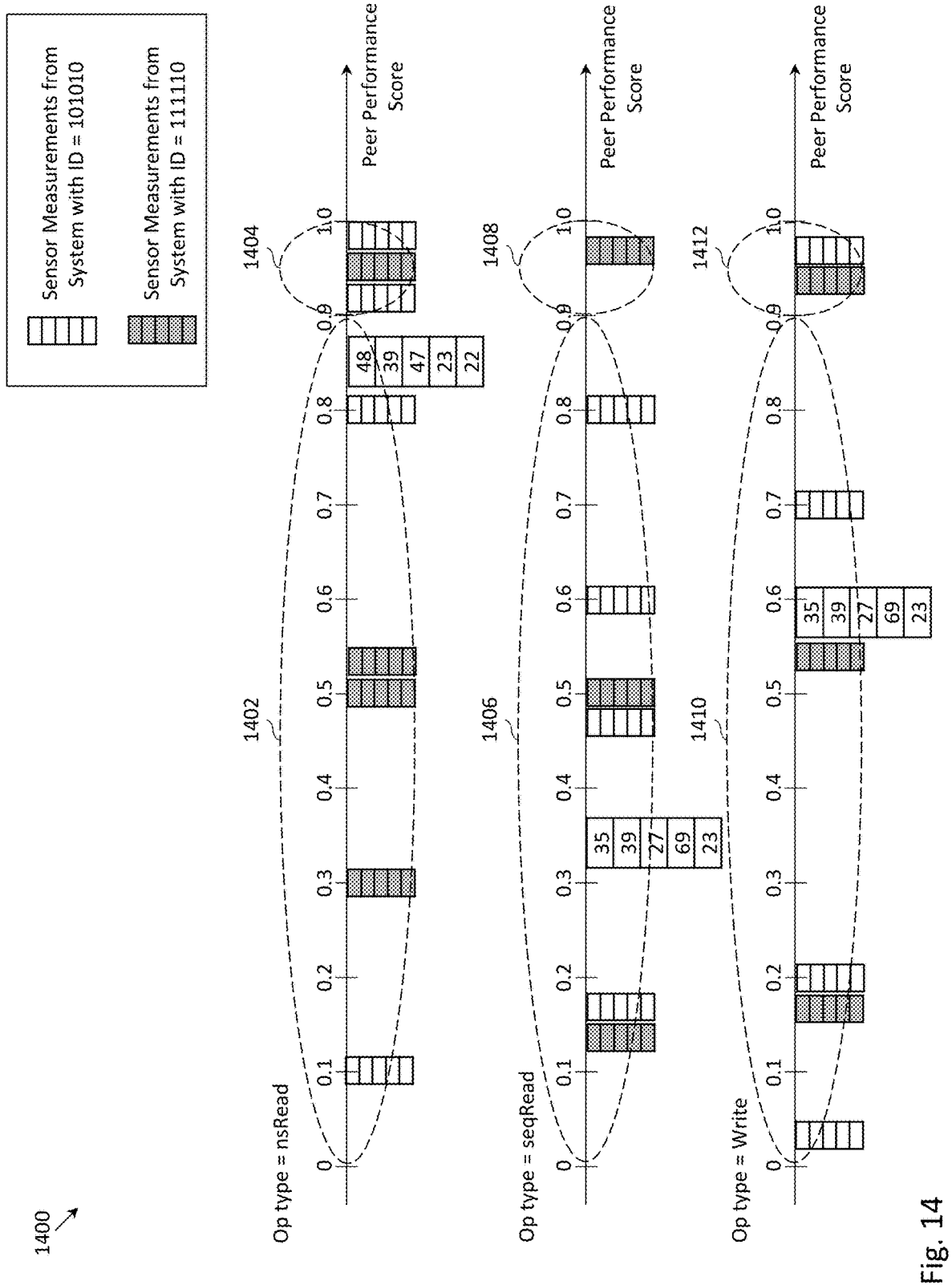
FIG. 14 depicts a diagram that describes a process of forming groups of performance characteristics that are associated with various ranges of peer performance scores, according to one embodiment.

FIG. 14 depicts diagram 1400 that describes a process of forming groups of performance characteristics that are associated with various operation types and ranges of peer performance scores, according to one embodiment. Group 1402 includes performance characteristics for operations with the representative operation type of nsRead (i.e., operation type that is characteristic of a large proportion of the operations within a measurement interval) and peer performance scores between 0 and 0.9 (i.e., normal performance). Group 1404 includes performance characteristics for operations with the representative operation type of nsRead and peer performance scores between 0.9 and 1.0 (i.e., poor performance). Group 1406 includes performance characteristics for operations with the representative operation type of seqRead and peer performance scores between 0 and 0.9 (i.e., normal performance). Group 1408 includes performance characteristics for operations with the representative operation type of seqRead and peer performance scores between 0.9 and 1.0 (i.e., poor performance). Group 1410 includes performance characteristics for operations with the representative operation type of write and peer performance scores between 0 and 0.9 (i.e., normal performance). Finally, group 1412 includes performance characteristics for operations with the representative operation type of write and peer performance scores between 0.9 and 1.0 (i.e., poor performance). Such ranges of peer performance scores are exemplary and other ranges may be employed.

Figure 15:
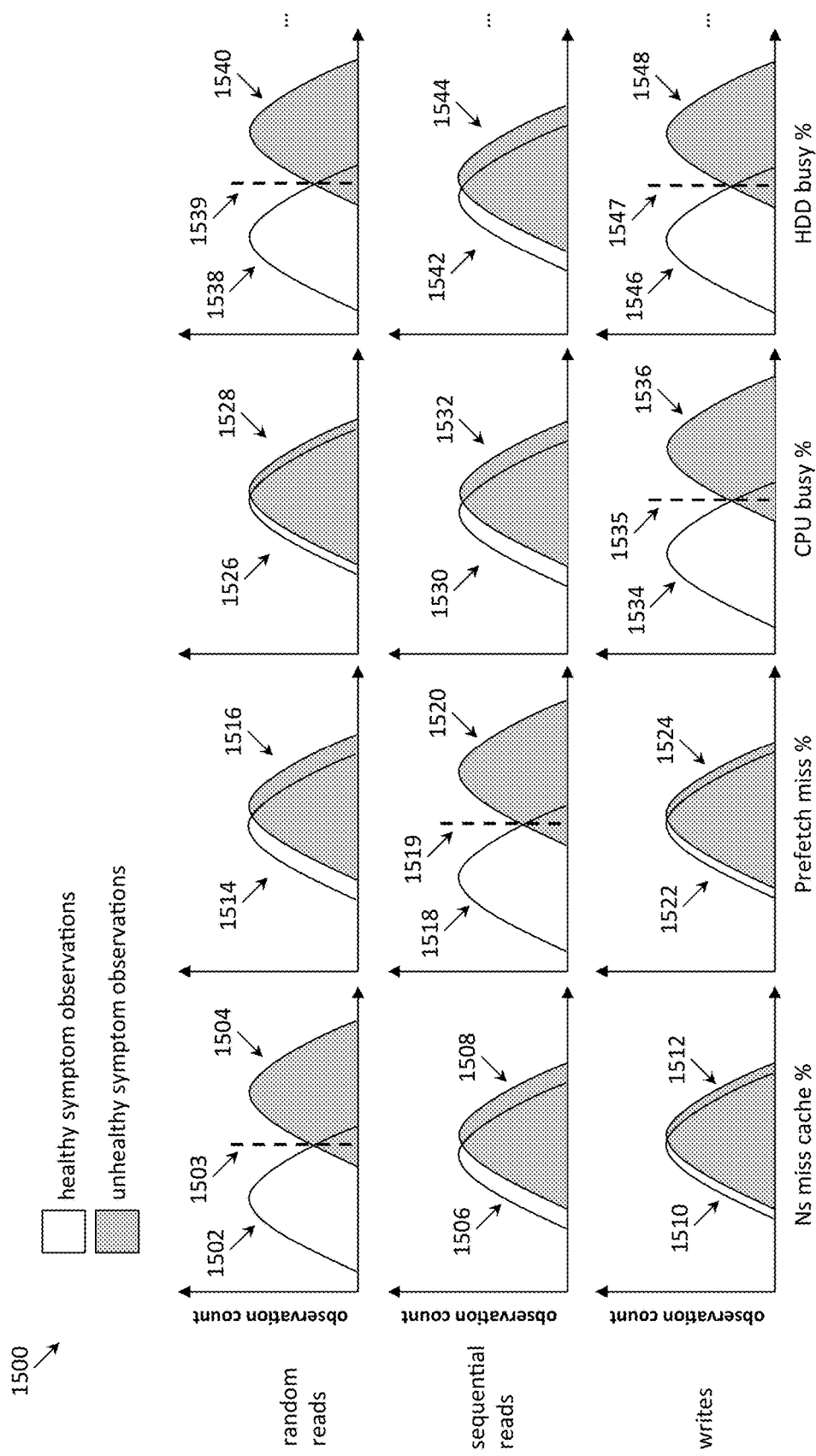
FIG. 15 depicts a plurality of symptom models constructed for specific types of operations and specific types of performance characteristics, according to one embodiment.

FIG. 15 depicts a plurality of symptom models constructed for specific types of operations and specific types of performance characteristics, according to one embodiment. In one embodiment, a symptom model defines a performance characteristic threshold that delineates poor performance (the performance associated with typical "unhealthy systems") from normal performance (the performance associated with typical "healthy systems"). As described below, such threshold does not always exist for a given operation type and performance characteristic type, in which case that performance characteristic type may not be a meaningful indicator of performance for the given operation type. If, however, a threshold does exist for a given operation type and performance characteristic type, that threshold suggests that a correlation exists between the given operation type and performance characteristic type.

In FIG. 15, distribution 1502 was generated from the "first row" of group 1402 (i.e., the non-sequential cache miss percentage for operation type=random read and peer performance score=0-0.9). Distribution 1504 was generated from the "first row" of group 1404 (i.e., the non-sequential cache miss percentage for operation type=nsRead and peer performance score=0.9-1.0). More specifically, a histogram may first be generated from the performance characteristics, before normalizing the histogram to form a distribution (i.e., normalizing the area under the histogram to have area equal to 1).

After distributions 1502 and 1504 have been determined, a determination may be made as to whether a bifurcation (e.g., a substantial bifurcation that would indicate strong correlation between the peer performance scores and the performance characteristics) exists between distributions 1502 and 1504. For example, a determination may be made that a bifurcation exists between distributions 1502 and 1504 if the area of overlap is 50% (or other percentage) or less (i.e., area of overlap referring to the area under distribution 1502 which overlaps with the area under distribution 1504). In the present case, the area of overlap between distributions 1502 and 1504 is less than 50%, indicating that a bifurcation exists between distributions 1502 and 1504.

Upon determining that a bifurcation exists between the distributions, a threshold may be determined which best separates distributions 1502 and 1504 (e.g., best separates a peak of distribution 1502 from a peak of distribution 1504). In one embodiment, the threshold may be determined as a performance characteristic value at which distribution 1502 intersects distribution 1504. In the present case, the threshold that separates a peak of distribution 1502 from a peak of distribution 1504 may be determined to be a non-sequential cache miss percentage of 10% (threshold depicted as element 1503 in FIG. 15).

In one embodiment, the determined threshold may form a symptom model. The symptom model may take as input a performance characteristic (in the present case, the non-sequential cache miss percentage) and characterize any non-sequential cache miss percentage above the threshold (in the present case above 10%) to be associated with poor performance, while characterizing any non-sequential cache miss percentage below the threshold (in the present case below 10%) to be associated with normal (or acceptable) performance. More generally, a symptom model may characterize a first range of a performance characteristic with a first performance level (e.g., normal performance) and a second range of the performance characteristic with a second performance level (e.g., poor performance).

In FIG. 15, distribution 1506 was generated from the "first row" of group 1406 (i.e., the non-sequential cache miss percentages categorized under operation type=seqRead and peer performance score=0-0.9). Distribution 1508 was generated from the "first row" of group 1408 (i.e., the non-sequential cache miss percentages categorized under operation type=seqRead and peer performance score=0.9-1.0). Since the overlap between distributions 1506 and 1508 is more than 50%, a determination may be made that no bifurcation exists between distributions 1506 and 1508, and no symptom model is formed for the performance characteristic type of non-sequential cache miss percentage and the operation type of sequential read, because the correlation between measurements of this performance characteristic type and its associated peer performance scores is insufficient.

In FIG. 15, distribution 1510 was generated from the "first row" of group 1410 (i.e., the non-sequential cache miss percentages categorized under operation type=write and peer performance score=0-0.9). Distribution 1512 was generated from the "first row" of group 1412 (i.e., the non-sequential cache miss percentages categorized under operation type=write and peer performance score=0.9-1.0). Since the overlap between distributions 1510 and 1512 is more than 50%, a determination may be made that no bifurcation exists between distributions 1510 and 1512, and no symptom model is formed for the performance characteristic type of non-sequential cache miss percentage and the operation type of write.

In FIG. 15, distribution 1514 was generated from the "second row" of group 1402 (i.e., the prefetch miss percentages categorized under operation type=random read and peer performance score=0-0.9). Distribution 1516 was generated from the "second row" of group 1404 (i.e., the prefetch miss percentages categorized under operation type=random read and peer performance score=0.9-1.0). Since the overlap between distributions 1514 and 1516 is more than 50%, a determination may be made that no bifurcation exists between distributions 1514 and 1516, and no symptom model is formed for the performance characteristic type of prefetch miss percentage and the operation type of random read.

In FIG. 15, distribution 1518 was generated from the "second row" of group 1406 (i.e., the prefetch miss percentages categorized under operation type=sequential read and peer performance score=0-0.9). Distribution 1520 was generated from the "second row" of group 1408 (i.e., the prefetch miss percentages categorized under operation type=sequential read and peer performance score=0.9-1.0). Since the overlap between distributions 1518 and 1520 is less than 50%, a determination may be made that a bifurcation exists between distributions 1518 and 1520. A symptom model with a prefetch miss percentage threshold of 33% (i.e., greater than 33% prefetch miss percentage is associated with poor performance) may be formed for the performance characteristic type of prefetch miss percentage and the operation type of sequential read (threshold depicted as element 1519 in FIG. 15).

In FIG. 15, distribution 1522 was generated from the "second row" of group 1410 (i.e., the prefetch miss percentages categorized under operation type=write and peer performance score=0-0.9). Distribution 1524 was generated from the "second row" of group 1412 (i.e., the prefetch cache miss percentages categorized under operation type=write and peer performance score=0.9-1.0). Since the overlap between distributions 1522 and 1524 is more than 50%, a determination may be made that no bifurcation exists between distributions 1522 and 1524, and no symptom model is formed for the performance characteristic type of prefetch miss percentage and the operation type of write.

In FIG. 15, distribution 1526 was generated from the "third row" of group 1402 (i.e., the CPU busy percentages categorized under operation type=random read and peer performance score=0-0.9). Distribution 1528 was generated from the "third row" of group 1404 (i.e., the CPU busy percentages categorized under operation type=random read and peer performance score=0.9-1.0). Since the overlap between distributions 1526 and 1528 is more than 50%, a determination may be made that no bifurcation exists between distributions 1526 and 1528, and no symptom model is formed for the performance characteristic type of CPU busy percentage and the operation type of random read.

In FIG. 15, distribution 1530 was generated from the "third row" of group 1406 (i.e., the CPU busy percentages categorized under operation type=sequential read and peer performance score=0-0.9). Distribution 1532 was generated from the "third row" of group 1408 (i.e., the CPU busy percentages categorized under operation type=sequential read and peer performance score=0.9-1.0). Since the overlap between distributions 1530 and 1532 is more than 50%, a determination may be made that no bifurcation exists between distributions 1530 and 1532, and no symptom model is formed for the performance characteristic type of CPU busy percentage and the operation type of sequential read.

In FIG. 15, distribution 1534 was generated from the "third row" of group 1410 (i.e., the CPU busy percentages categorized under operation type=write and peer performance score=0-0.9). Distribution 1536 was generated from the "third row" of group 1412 (i.e., the CPU busy percentages categorized under operation type=write and peer performance score=0.9-1.0). Since the overlap between distributions 1534 and 1536 is less than 50%, a determination may be made that a bifurcation exists between distributions 1534 and 1536. A symptom model with a CPU busy percentage threshold of 10% (i.e., greater than 10% CPU busy percentage is associated with poor performance) may be formed for the performance characteristic type of CPU busy percentage and the operation type of write (threshold depicted as element 1535 in FIG. 15).

In FIG. 15, distribution 1538 was generated from the "fourth row" of group 1402 (i.e., the hard disk drive busy percentages categorized under operation type=random read and peer performance score=0-0.9). Distribution 1540 was generated from the "fourth row" of group 1404 (i.e., the hard disk drive busy percentages categorized under operation type=random read and peer performance score=0.9-1.0). Since the overlap between distributions 1538 and 1540 is less than 50%, a determination may be made that a bifurcation exists between distributions 1538 and 1540. A symptom model with a hard disk drive busy percentage threshold of 11% (i.e., greater than 11% hard disk drive busy percentage is associated with poor performance) may be formed for the performance characteristic type of hard disk drive busy percentage and the operation type of random read (threshold depicted as element 1539 in FIG. 15).

In FIG. 15, distribution 1542 was generated from the "fourth row" of group 1406 (i.e., the hard disk drive busy percentages categorized under operation type=sequential read and peer performance score=0-0.9). Distribution 1544 was generated from the "fourth row" of group 1408 (i.e., the hard disk drive busy percentages categorized under operation type=sequential read and peer performance score=0.9-1.0). Since the overlap between distributions 1542 and 1544 is more than 50%, a determination may be made that no bifurcation exists between distributions 1542 and 1544, and no symptom model is formed for the performance characteristic type of hard disk drive busy percentage and the operation type of sequential read.

In FIG. 15, distribution 1546 was generated from the "fourth row" of group 1410 (i.e., the hard disk drive busy percentages categorized under operation type=write and peer performance score=0-0.9). Distribution 1548 was generated from the "fourth row" of group 1412 (i.e., the hard disk drive busy percentages categorized under operation type=write and peer performance score=0.9-1.0). Since the overlap between distributions 1546 and 1548 is less than 50%, a determination may be made that a bifurcation exists between distributions 1546 and 1548. A symptom model with a hard disk drive busy percentage threshold of 15% (i.e., greater than 15% hard disk drive busy percentage is associated with poor performance) may be formed for the performance characteristic type of hard disk drive busy percentage and the operation type of write (threshold depicted as element 1547 in FIG. 15). For brevity of explanation, no symptom models have been included for the performance characteristic of sequential miss cache percentage.

Figure 16A:
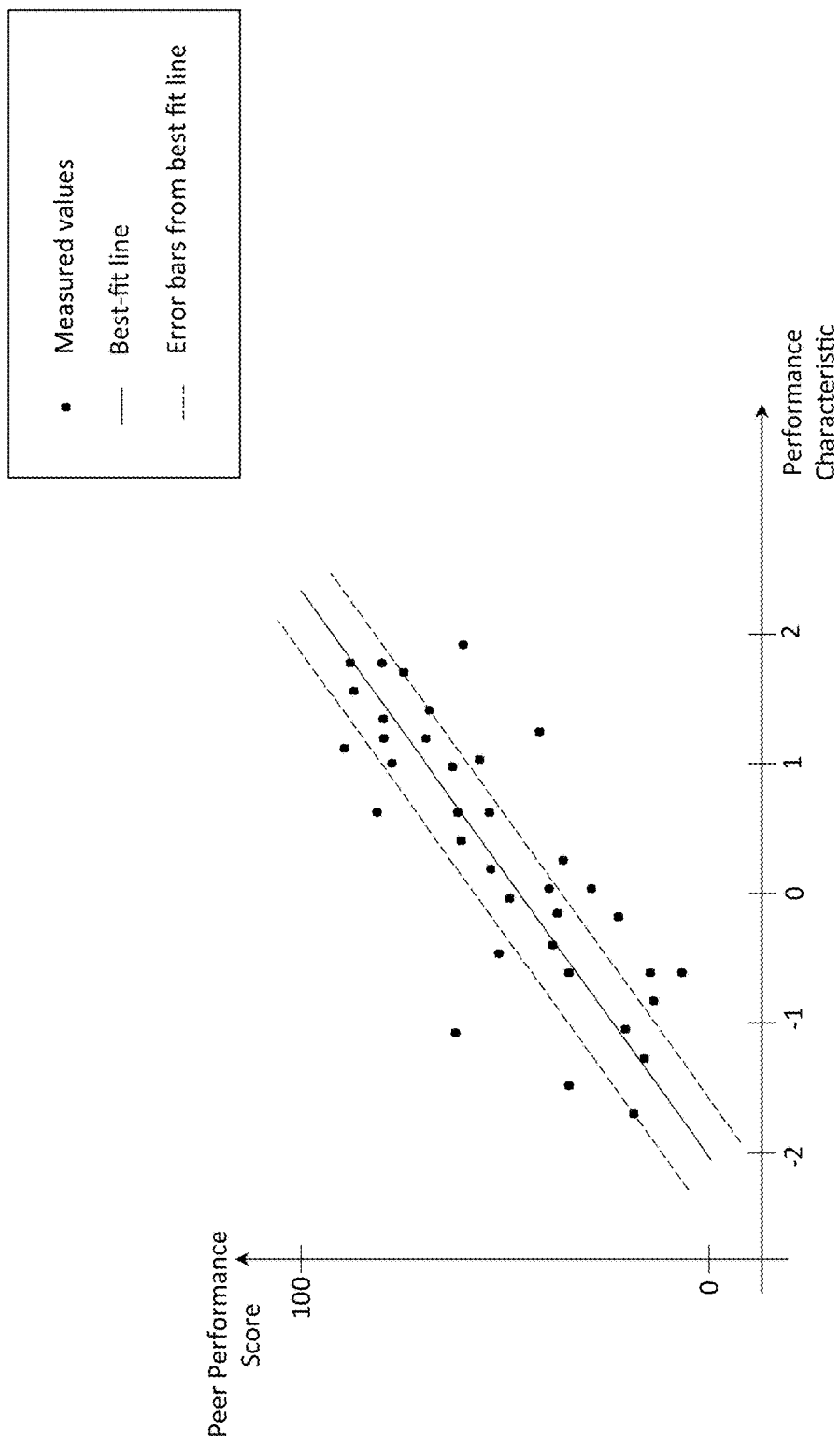
FIGS. 16A-16C depict a plurality of symptom models (with continuous valued output), according to one embodiment.
Figure 16B:
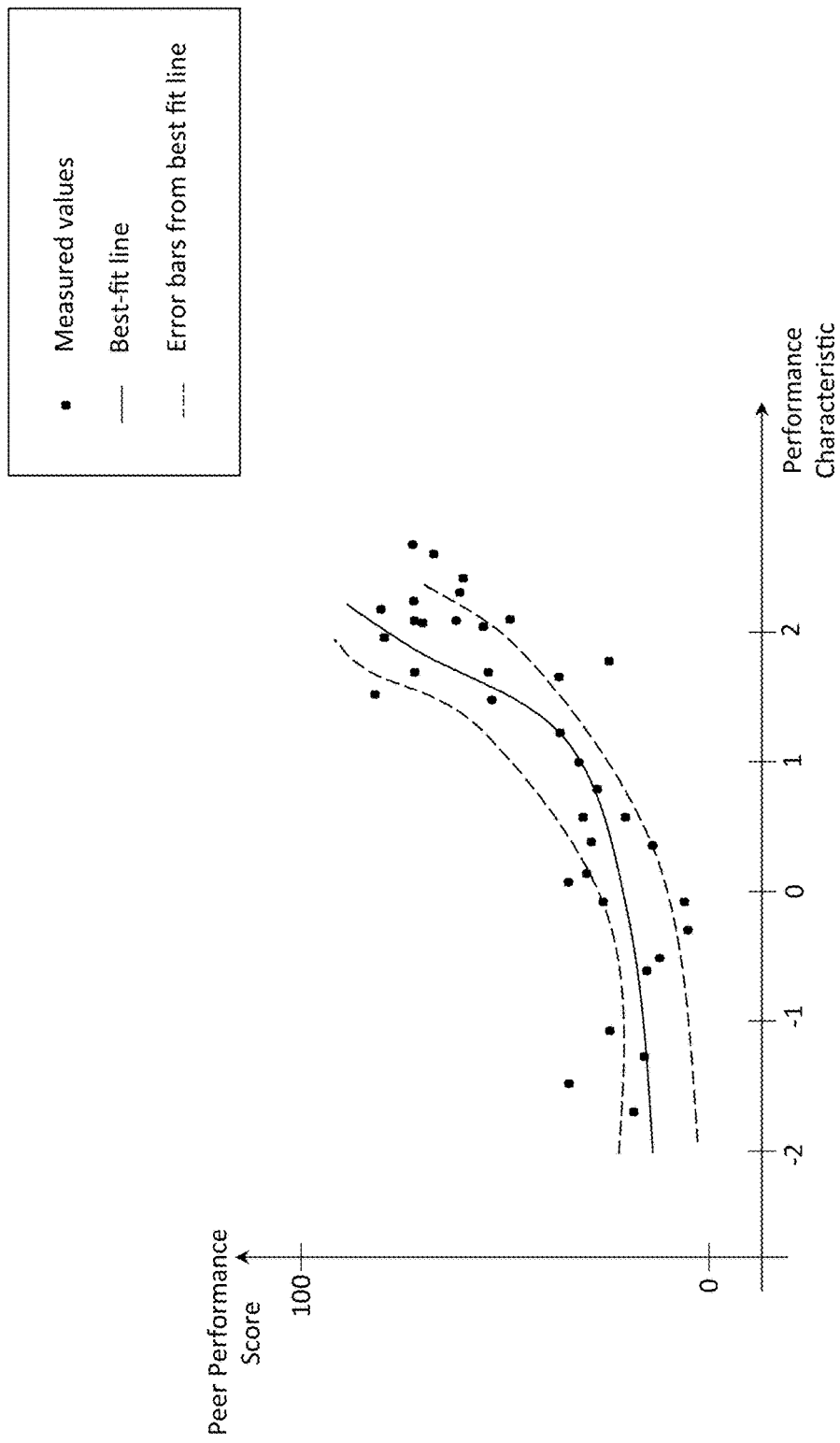
Figure 16C:
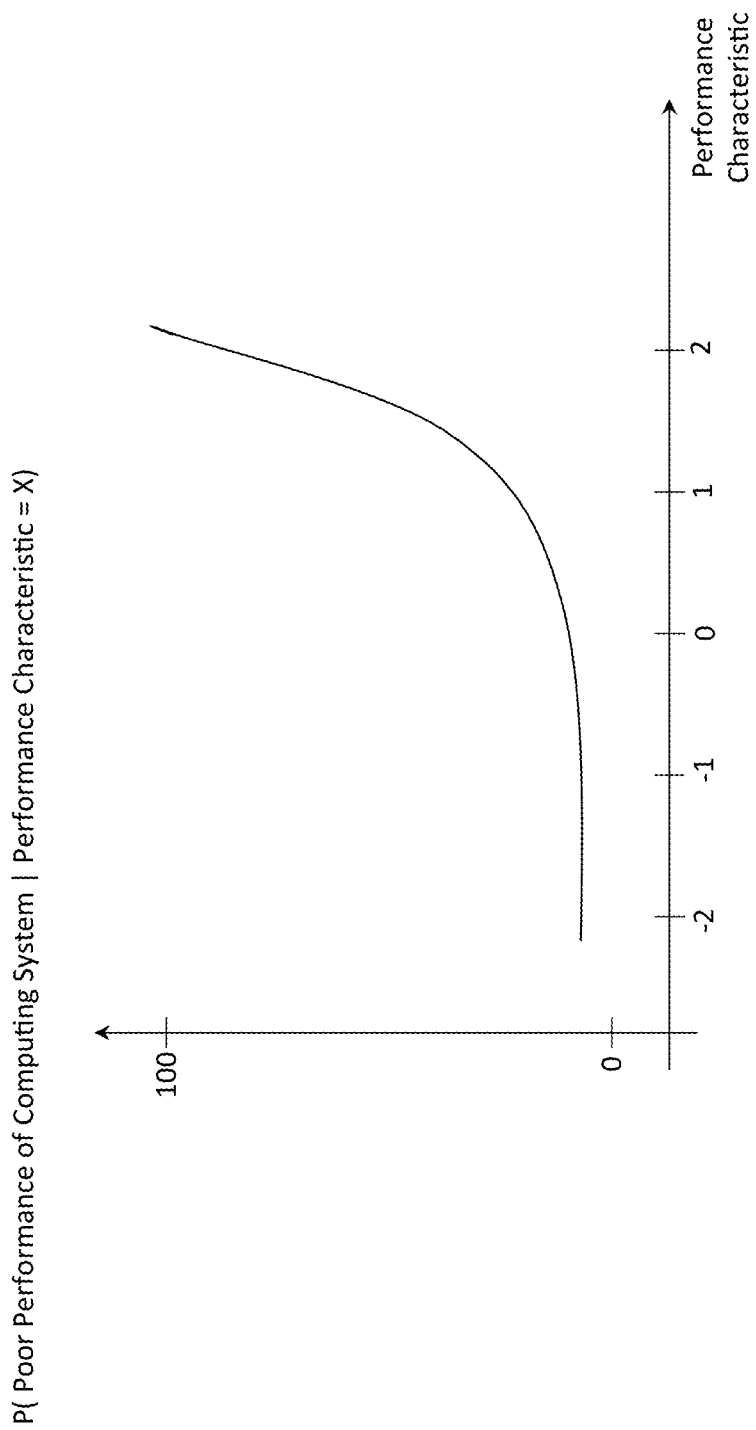

While the symptom models described in FIG. 15 were constructed from thresholds and generated binary output (i.e., symptom absent or symptom present), other symptom models, as described in FIGS. 16A-C, may be employed. The symptom models described in FIGS. 16A-C may be constructed with scoring functions that map a performance characteristic to a symptom score (or symptom severity score). As shown in FIG. 16A, a scatter plot may be generated based on pairings of performance characteristics and peer performance scores (for a particular operation type). Assuming that the performance characteristic type is the non-sequential cache miss percentage, and further assuming that the operation type is "nsRead", the pairings would include the first row of all the columns classified under operation type "nsRead" in FIG. 14 as the x-coordinates of the pairings and the corresponding peer performance scores as the y-coordinates of the pairings. A least-squares line may be calculated from the pairings of performance characteristics and the peer performance scores, and this least-squares line (or more generally, a "best-fit line") may form the symptom model. It is noted that while the range (and even units) of the least-square line is identical to the range of peer performance scores, the output of the symptom model is not a peer performance score, but a different score, called the symptom score (or symptom severity score). Further, error bars may be calculated representing the degree of variation of the data points from the best-fit line. In an alternative embodiment, the error bars may form the symptom model, and the output of the symptom model may be a range of symptom scores (i.e., the range of symptom scores corresponding to a particular performance characteristic value).

In FIG. 16A, the scatter plot exhibited a linear correlation between the performance characteristic and the peer performance score, while this may not be true in general. In FIG. 16B, the scatter plot exhibits a non-linear correlation between the performance characteristic and the peer performance score. In such case, a parameterized curve with two or parameters may be optimized to fit the data depicted in the scatter plot (i.e., optimized to minimize the squared error separating each data point from the parameterized curve).

In FIG. 16C, a plot is displayed which maps performance characteristic values to a conditional probability. The particular conditional probability function depicted in FIG. 16C is the probability of poor performance of a computing system, given a certain performance characteristic value. It is noted that the shape of the conditional probability function is exemplary, and that such shape will have many variations in practice. Such conditional probability function may be constructed based on Bayes' Rule and the data captured in Table 1206. Another conditional probability function of interest (not depicted) is the probability of normal performance of a computing system, given a certain performance characteristic value.

The following explains the construction of the conditional probability function in more detail. The distributions shown in FIG. 15 constitute conditional probabilities. Specifically, they represent the following two distributions: P('x'|healthy) and P('x'|unhealthy). P('x'|healthy) is the probability that a performance characteristic is 'x' given the performance characteristic is healthy (i.e., associated with a peer performance score between 0 and 0.90). P('x'|unhealthy) is the probability that a performance characteristic is 'x' given the performance characteristic is unhealthy (i.e., associated with a peer performance score greater than 0.90). Because, healthy (or normal performance) was associated with performance characteristics having a peer performance score between 0 and 0.90 and unhealthy (or poor performance) was associated with performance characteristics having a peer performance score greater than 0.90, P(healthy) (i.e., the probability of an observation with a peer performance score between 0 and 0.90) is known to be 90%, and P(unhealthy) (i.e., the probability of an observation with a peer performance score greater than 0.90) is known to be 10%.

Bayes' theorem states that P(A|B)=(P(B|A)*P(A))/P(B). To calculate the probability that an observed performance characteristic is unhealthy, given the observed performance characteristic, P(unhealthy|'x') needs to be determined. P(unhealthy|'x') may be calculated as (P('x'|unhealthy)*P(unhealthy))/P('x'). Based on the definition of healthy vs. unhealthy, a performance characteristic will either fall into the healthy or the unhealthy category. It follows that P(healthy)+P(unhealthy)=1 and that P('x')=P('x'|healthy)P(healthy)+P('x'|unhealty)P(unhealthy). By substituting the expression for P('x') into the previous expression for P(unhealthy|'x'), P(unhealthy|'x') may be calculated as (P('x'|unhealthy)*P(unhealthy))/(P('x'|healthy)P(healthy)+P('x'|unhealthy)P(unhealthy)). Therefore, P(unhealthy|'x') is now expressed in terms of the known quantities P('x'|unhealthy), P('x'|healthy), P(unhealthy) and P(healthy). Further, if the performance characteristics are observed over a large enough ensemble of computing systems, "the probability that an observed performance characteristic is unhealthy, given the observed performance characteristic" is approximately equal to "the probability that the computing system is unhealthy, given the observed performance characteristic" (i.e., the performance characteristic being observed for the computing system).

It is further noted that such conditional probability distributions (e.g., P(unhealthy|'x') are most meaningful when a sufficiently large bifurcation exists between the distributions of P('x'|healthy) and P('x'|unhealthy). Only when there is a large separation between P('x'|healthy) and P('x'|unhealthy) does the particular 'x' in question (e.g., CPU Busy %) have much influence on whether or not the computing system is healthy.

If not already apparent, it is noted that P(healthy|'x'), the probability of a computing system being healthy, given an observed performance characteristic may be calculated as 1−P(unhealthy|'x').

Figure 17A:
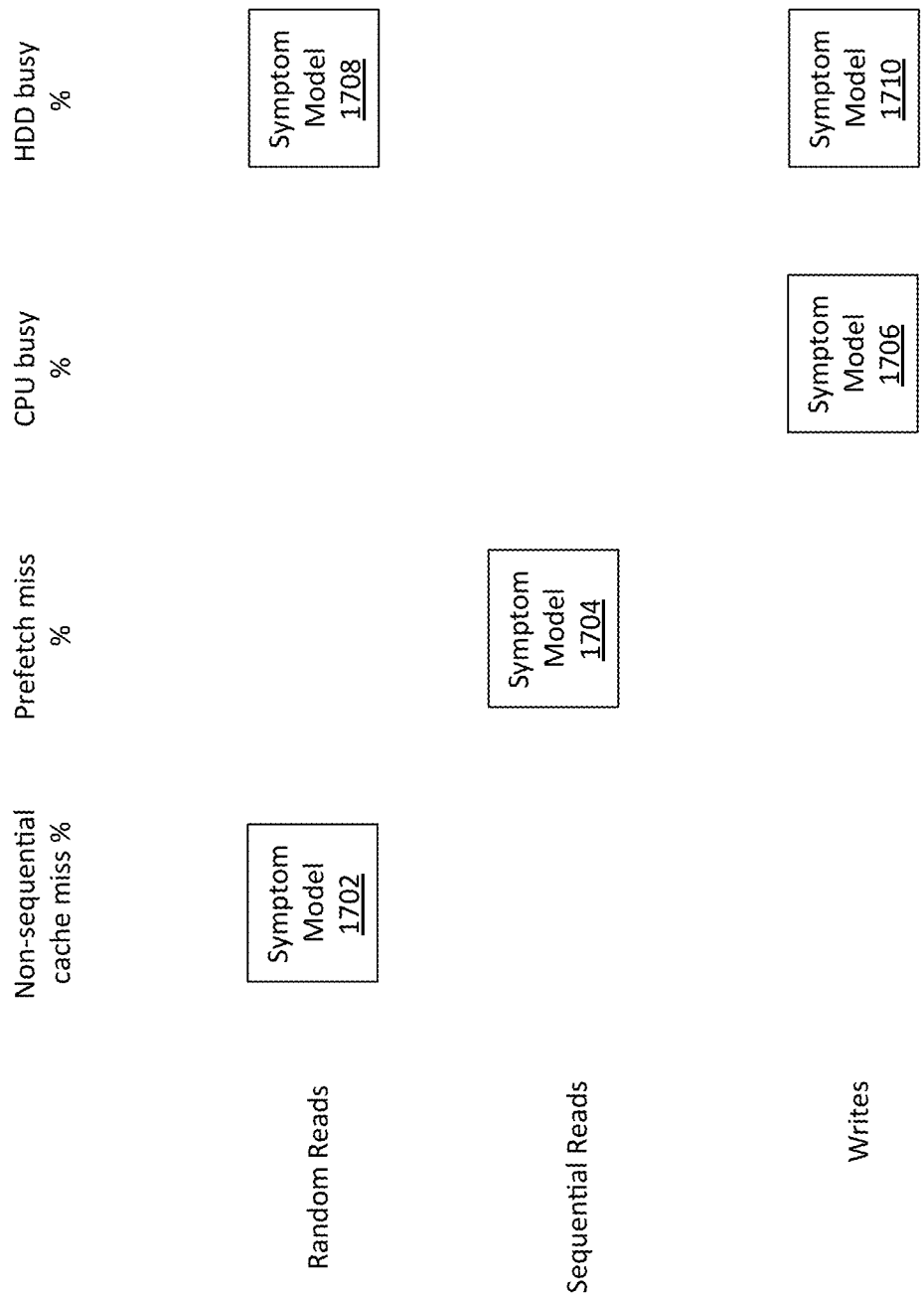
FIG. 17A depicts a plurality of symptom models.

FIG. 17A depicts a summary of the symptom models that were described in FIG. 15. Symptom model 1702 represents the non-sequential cache miss percentage threshold of 10% for random reads. Symptom model 1704 represents the prefetch miss percentage threshold of 33% for sequential reads. Symptom model 1706 represents the CPU busy percentage threshold of 10% for writes. Symptom model 1708 represents the hard disk drive busy percentage threshold of 11% for random reads. Symptom model 1710 represents the sequential cache miss percentage threshold of 15% for random reads.

The instant example demonstrates that it is possible for one operation type to have two or more symptom models (e.g., symptom models 1702 and 1708 both correspond to the operation type of random reads). The output of the two or more symptom models may be consistent (i.e., both indicate poor performance) or inconsistent (i.e., one indicates poor performance while another indicates normal performance). These discrepancies may be beneficial as they can enable differentiation between distinct possible root causes for poor performance; some storage system may be experiencing problems due to a cause indicated by performance characteristic 'A' but not 'B'—while another storage system may be experiencing performance issues due to a cause indicated by performance characteristic 'B' but not 'A'. In this way, symptom models may be useful diagnostically as they provide insight into the most significant contributors to any existing performance issues. This is why the output of symptom models serve as part of the input to diagnosis models, as described below. The instant example also demonstrates that it is possible for one performance characteristic to have two or more symptom models (e.g., symptom models 1708 and 1710 both correspond to the performance characteristic of HDD busy percentage).

Figure 17B:
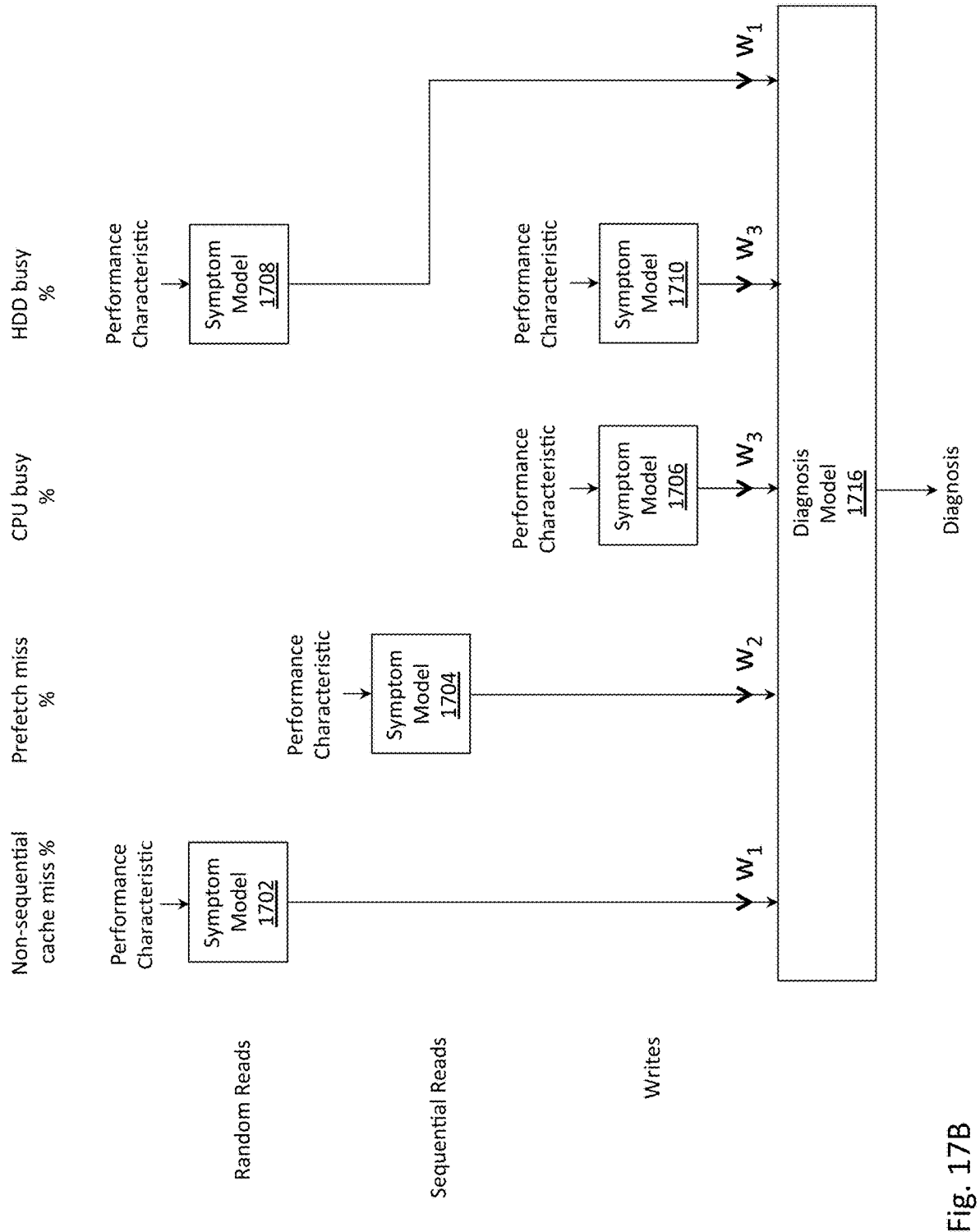
FIG. 17B depicts the plurality of symptom models in conjunction with a diagnosis model that maps the severity of the plurality of symptoms to one or more diagnoses, according to one embodiment.

FIG. 17B depicts the plurality of symptom models from FIG. 17A, and further depicts a diagnosis model which maps the presence or absence of symptoms and/or the severity of symptoms (i.e., the output of the symptom models) to one or more diagnoses, according to one embodiment. Performance characteristics may be provided as input to each of the symptom models, and the output of each of the symptom models (and other possible signals) may be provided as input to diagnosis model 1716. It is noted that a difference in granularity between the performance characteristics and the symptom models may exist (similar to the difference in granularity between performance characteristics and operation information discussed above with respect to FIG. 12). Symptom models may be constructed for operation types (in addition to performance characteristic types), whereas performance characteristics may not be broken down by operation type.

One option would be to make the same approximation described above in FIG. 12, and assign the performance characteristic to one or more representative operation types, and then only provide the performance characteristic as input to a symptom model if the assigned operation type of the performance characteristic matches the operation type of the symptom model. Using the example of FIG. 12 and assuming the performance characteristics of measurement interval 2 were being applied to the symptom models of FIG. 17B, only the symptom models constructed for the operation type of random reads would be applied since the representative operation type for measurement interval 2 is random reads. Accordingly, the non-sequential cache miss percentage of 48% would be applied to symptom model 1702 and the hard disk drive busy percentage of 23% would be applied to symptom model 1708. The outputs of the symptom models would be directly provided to diagnosis model 1716 (i.e., with all weights, $w_i$, equal to 1).

In an alternative embodiment, all performance characteristics measured during a measurement interval may be provided to corresponding symptom models (i.e., symptom model(s) which match the type of the performance characteristic), and the output of the symptom models may be weighted by the "% Op type" of the measurement interval. Using the example of FIG. 12 and assuming the performance characteristics of measurement interval 2 were being applied to the symptom models of FIG. 17B, the non-sequential cache miss percentage of 48% would be provided as input to symptom model 1702, the prefetch miss percentage of 39% would be provided as input to symptom model 1704, the CPU busy percentage of 47% would be provided as input to symptom model 1706, and so on. The output of symptom model 1702 would be weighted by 80% (i.e., $w_1=0.8$); the output of symptom model 1704 would be weighted by 10% (i.e., $w_2=0.1$); the output of symptom model 1706 would be weighted by 10% (i.e., $w_3=0.1$); and so on.

Figure 18:
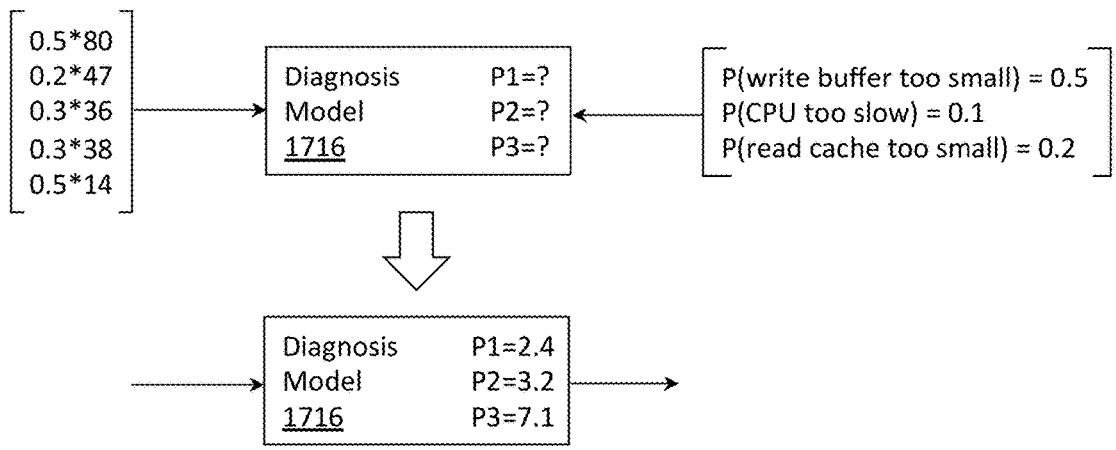
FIG. 18 depicts examples that describe a process for training the diagnosis model and a process for applying the diagnosis model, according to one embodiment.
Figure 18:
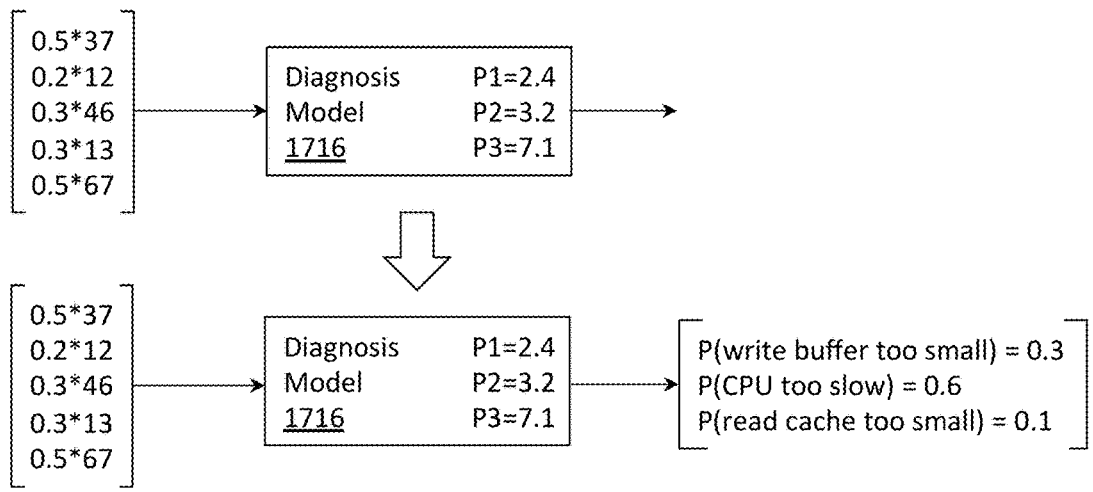

Diagnosis model 1716 then maps the presence or absence of symptoms and/or the severity of symptoms (i.e., the output of the symptom models) to one or more diagnoses. More details regarding diagnosis model 1716 are provided below in FIG. 18. FIG. 18 depicts examples that describe a process for training diagnosis model 1716 and a process for applying the diagnosis model, according to one embodiment. In one embodiment, diagnosis model 1716 comprises a plurality of parameters (e.g., $p_1$, $p_2$, $p_3$) and a relationship between the parameters (e.g., relationship defined via equations). In a human-curated diagnosis model 1716, a human operator may determine the probability thresholds required for a system to trigger a diagnosis. With a diagnosis model trained using supervised machine learning techniques, examples of systems that have been independently diagnosed will have their telemetry provided into the performance severity and symptom severity models and those scores will be used as examples by the machine learned model to score new telemetry. In the example of FIG. 18, assume the human operator determined the thresholds for a particular diagnosis to be P(write buffer too small)=0.5, P(CPU too slow)=0.1, and P(read cache too small)=0.2 (i.e., P being an abbreviation for Probability) corresponding to the weighted output of the symptom models of [0.5*80, 0.2*47, 0.3*36 0.3*38, 0.5*14] (i.e., each item of the vector constructed as a weight multiplied by a symptom severity score). In the human-curated design of diagnosis model 1716, both the weighted output of the symptom models and the human determined diagnosis would be provided as input to the diagnosis model in order to tune the parameters of diagnosis model 1716. In the example of FIG. 18, the parameters were tuned as followed: $p_1=2.4$; $p_2=3.2$, $p_3=7.1$.

After the parameters of diagnosis model 1716 have been tuned (or sufficiently tuned), the diagnosis model may be applied. In the application of diagnosis model 1716, the weighted output of the symptom models of [0.5*37, 0.2*12, 0.3*46, 0.3*13, 0.5*67] may be provided as input to diagnosis model 1716. The diagnosis model, may in turn determine one or more diagnosis of the storage system. In the example of FIG. 18, the diagnosis was determined as P(write buffer too small)=0.3, P(CPU too slow)=0.6, and P(read cache too small)=0.1.

It is noted that in many instances, the diagnosis for a measurement interval may be consistent with the peer performance scores for that measurement interval. For example, the diagnosis of "no detected issues" may be provided for a measurement interval with low peer performance scores (i.e., indicating low latency with respect to peer systems). As another example, the diagnosis of "write cache too small" may be provided for a measurement interval with high peer performance scores (i.e., indicating high latency with respect to peer systems). In other instances, the diagnosis for a measurement interval may not be consistent with the peer performance scores for that measurement interval. For example, the diagnosis of "no detected issues" may be provided for a measurement interval with high peer performance scores. In such cases, the diagnosis may be flagged as being unreliable, and the operator may be alerted that the system may be experiencing an idiopathic condition (i.e., a condition for which the cause is unknown). Further, additional types of performance characteristics and symptom models may be considered in order to properly diagnose the issue.

Figure 19:
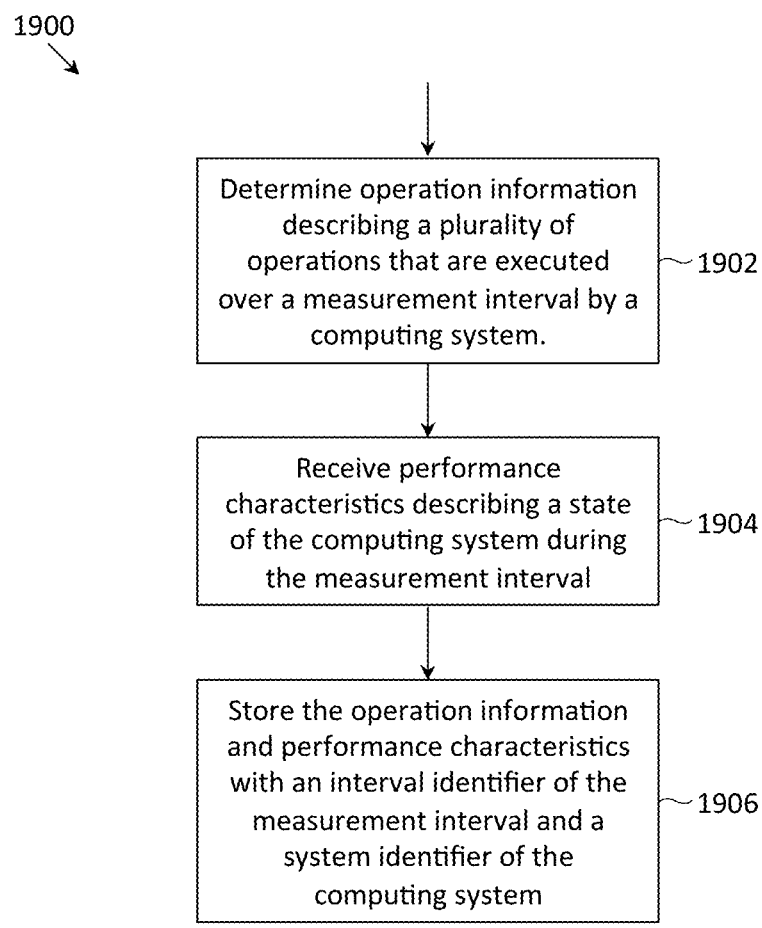
FIG. 19 depicts a flowchart for forming a correspondence between the operation information and the performance characteristics that share a common measurement interval and relate to a common storage system, according to one embodiment.

FIG. 19 depicts flowchart 1900 for forming a correspondence between the operation information and the performance characteristics that share a common measurement interval (e.g., a 1-minute interval) and relate to a common computing system, according to one embodiment. At step 1902, the analysis server may determine operation information describing a plurality of operations that are executed over a measurement interval by a computing system. The operation information may include an operation count and an average operation latency for a group of operations with a certain operation size and type. The operation size may refer to the size of the payload of an operation (e.g., size of file to be written, size of file to be read, etc.). Examples of operation types include a non-sequential read (or random read), a sequential read, a non-sequential write (or random write) and a sequential write. An example of such operation information was provided in FIG. 5 above.

At step 1904, the analysis server may receive performance characteristics describing a state of the computing system during the measurement interval. Performance characteristics may include a non-sequential cache miss percentage, a prefetch miss percentage, a CPU busy percentage, a hard disk drive busy percentage, a solid state drive busy percentage, and a sequential cache miss percentage (each of the performance characteristics averaged over the measurement interval). An example of performance characteristics for a plurality of measurement intervals was provided in FIG. 12 above.

At step 1906, the analysis server may store the operation information and performance characteristics with an interval identifier of the measurement interval and a system identifier of the computer system. To provide an example of step 1906, FIGS. 9 and 12 are revisited. In the FIG. 9, the operation information (i.e., "aggregate operation information") was labeled with measurement interval 2 and system ID 101010. In FIG. 12 (i.e., table 1204), the first column of performance characteristics is also labeled with measurement interval 2 and system ID 101010. This identical labeling indicates that the above-mentioned operation information and performance characteristics are drawn from the same measurement interval and same computer system. The identical labeling forms a correspondence between the above-mentioned operation information and performance characteristics, facilitating the construction of the symptom models.

Figure 20:
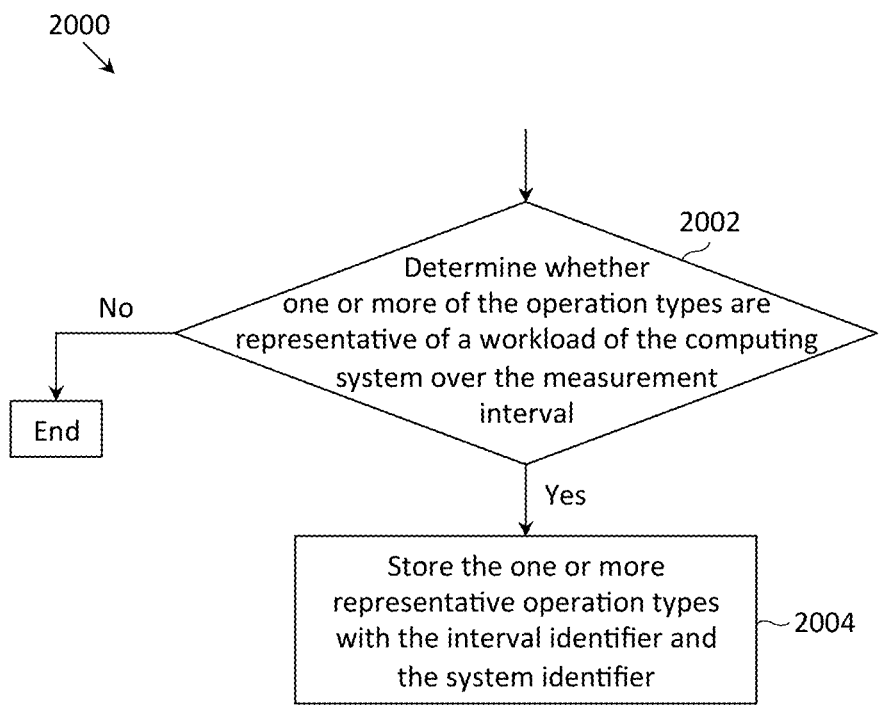
FIG. 20 depicts a flowchart for forming a correspondence between representative operation types and the performance characteristics that relate to a common measurement interval and a common storage system, according to one embodiment.

FIG. 20 depicts flowchart 2000 for forming a correspondence between representative operation types and the performance characteristics that relate to a common measurement interval and a common storage system, according to one embodiment. At step 2002, the analysis server may determine whether one or more of the operation types are representative of a workload of the computing system over the measurement interval. In one embodiment, the proportion of each type of operation (in terms of operation count or throughput) is compared to a threshold (e.g., 40%), and if such proportion exceeds the threshold, the corresponding operation type may be considered to be representative of the measurement interval. If none of the proportions exceed the threshold, the process may end. Otherwise, at step 2004, the analysis server may store the one or more representative operation types with the interval identifier and the system identifier. Such step was described above in Table 1206 of FIG. 12, in which the operation type of "random read" was labeled with the interval identifier of "2" and system ID 101010; the operation type of "sequential read" was labeled with the interval identifier of "4" and system ID 101010; and so on.

Figure 21:
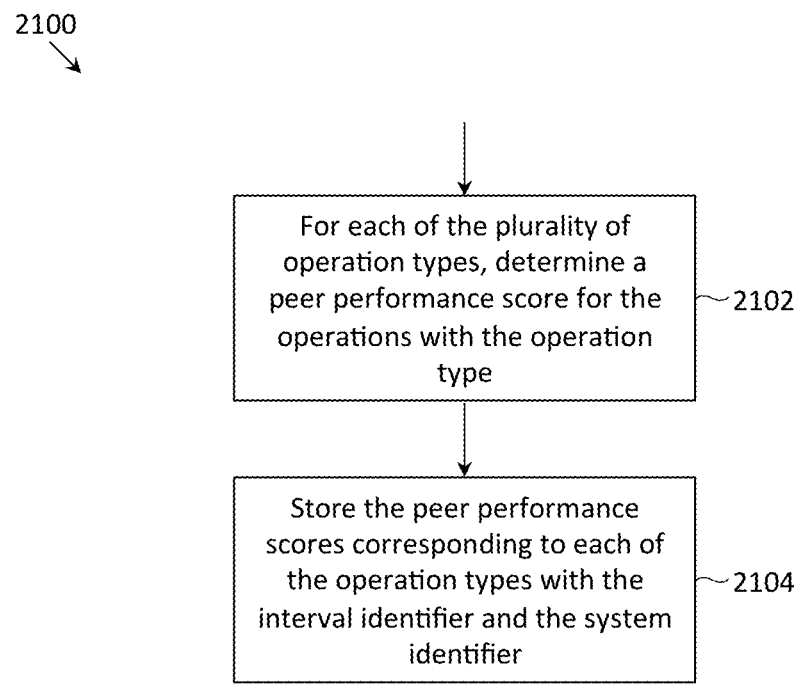
FIG. 21 depicts a flowchart for forming a correspondence between peer performance scores and performance characteristics that relate to a common measurement interval and a common storage system, according to one embodiment.

FIG. 21 depicts flowchart 2100 for forming a correspondence between peer performance scores and performance characteristics that relate to a common measurement interval and a common storage system, according to one embodiment. At step 2102, for each of the plurality of operation types, the analysis server may determine a peer performance score for the group of operations with the operation type. Such step was described above in Table 1202 of FIG. 12, in which the peer performance scores of 85, 10 and 23 were determined for the groups of operations with the operation type of random read, sequential read and write, respectively, in measurement interval 2; etc. At step 2104, the analysis server may store the peer performance scores corresponding to each of the operation types with the interval identifier of the measurement interval and the system identifier of the computing system. Such step was also described above in Table 1202 of FIG. 12, in which the peer performance scores of 85, 10 and 23 were labeled with measurement interval 2 and storage system ID 101010; the peer performance scores of 38, 12 and 24 were labeled with measurement interval 3 and storage system ID 101010; etc.

Figure 22:
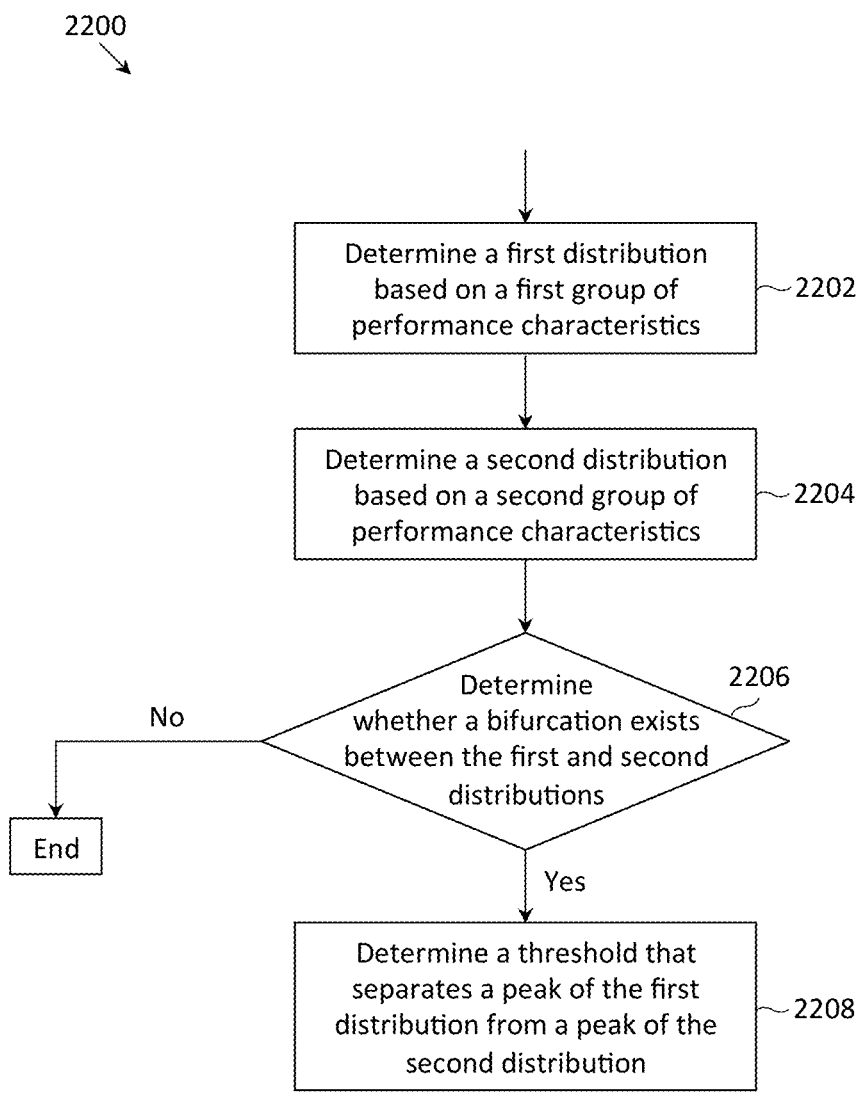
FIG. 22 depicts a flowchart for constructing a symptom model with a binary output, according to one embodiment.

FIG. 22 depicts flowchart 2200 for constructing a symptom model with a binary output, according to one embodiment. At step 2202, the analysis server may determine a first distribution based on a first group of performance characteristics. The first group of performance characteristics may belong to a first performance characteristic type (e.g., non-sequential cache miss percentage, prefetch miss percentage, CPU busy percentage, etc.) may be labeled with a first range of peer performance scores and may be labeled with a first representative operation type. Distribution 1502 in FIG. 15 was an example of the first distribution. At step 2204, the analysis server may determine a second distribution based on a second group of performance characteristics. The second group of performance characteristics may belong to the first performance characteristic type, may be labeled with a second range of peer performance scores and may be labeled with the first representative operation type. Distribution 1504 in FIG. 15 was an example of the second distribution.

At step 2206, the analysis server may determine whether a bifurcation exists between the first distribution and the second distribution. In one embodiment, the analysis server may determine that a bifurcation exists if the area of overlap is 50% (or other percentage) or less (i.e., area of overlap referring to the area under the first distribution which overlaps with the area under the second distribution). If a bifurcation exists, the analysis server may determine a threshold (e.g., 1503 in FIG. 15) that separates a peak of the first distribution from a peak of the second distribution (step 2208). Such threshold may form a symptom model that is specific to a certain operation type and performance characteristic.

The symptom model may generalize that any value of a performance characteristic above the threshold is associated with poor performance and any value of the performance characteristic below the threshold is associated with normal performance. More generally, a symptom model may associate a first range of a performance characteristic with a first performance level (e.g., normal performance) and a second range of the performance characteristic with a second performance level (e.g., poor performance). Even more generally, a symptom model may constitute a continuous mapping between performance characteristics and symptom severity scores, as illustrated above in FIGS. 16A-C.

While much of the description relates to storage systems, it is understood that the above-described techniques are not limited to storage systems. More generally, the above-described techniques can be applied to characterize the performance of other computing systems, such as host machines, application servers, virtual machines, etc.

Figure 23:
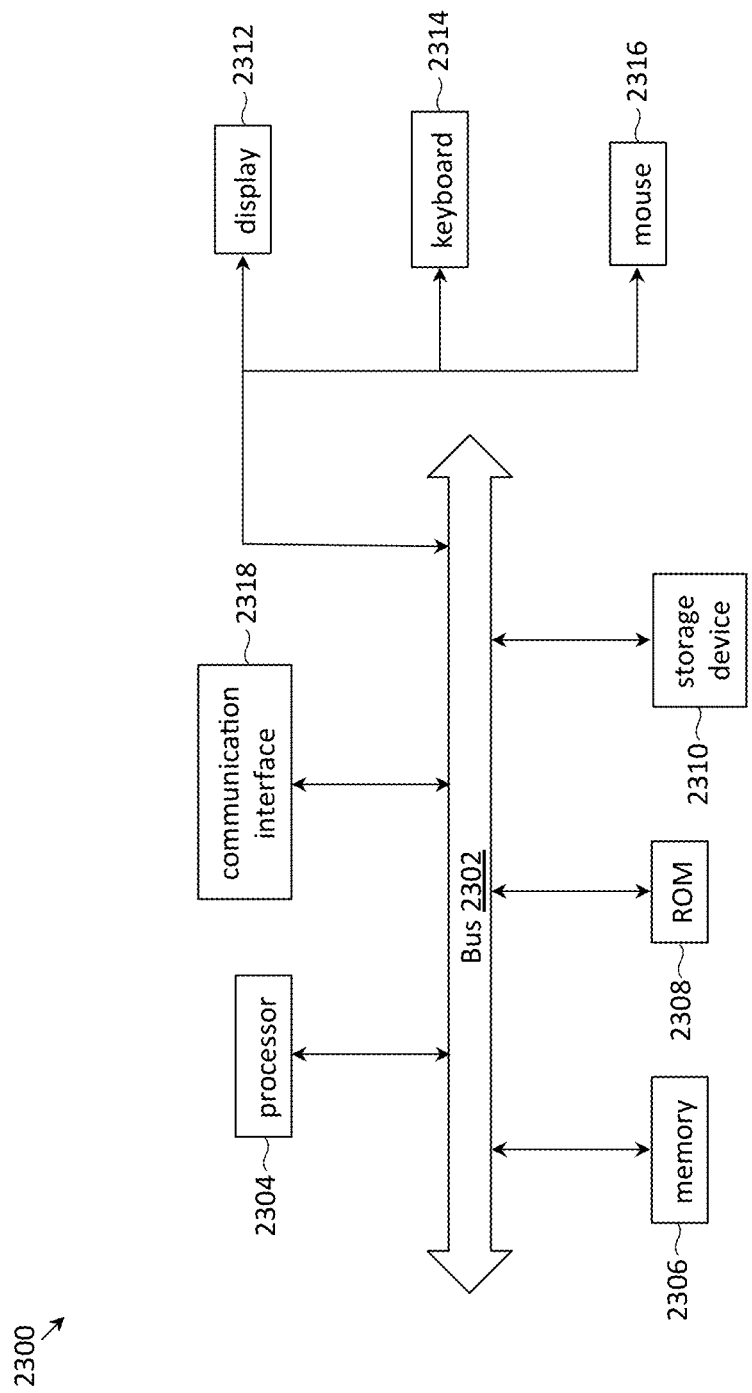
FIG. 23 depicts components of a computer system in which computer readable instructions instantiating the methods of the present invention may be stored and executed.

FIG. 23 provides an example of system 2300 that is representative of any of monitoring server 28, analysis server 32 or client device 36 depicted above in FIG. 1 (i.e., any processor-based system). Note, not all of the various processor-based systems which may be employed in accordance with embodiments of the present invention have all of the features of system 2300. For example, certain processor-based systems may not include a display inasmuch as the display function may be provided by a client computer communicatively coupled to the processor-based system or a display function may be unnecessary. Such details are not critical to the present invention.

System 2300 includes a bus 2302 or other communication mechanism for communicating information, and a processor 2304 coupled with the bus 2302 for processing information. System 2300 also includes a main memory 2306, such as a random access memory (RAM) or other dynamic storage device, coupled to the bus 2302 for storing information and instructions to be executed by processor 2304. Main memory 2306 also may be used for storing temporary variables or other intermediate information during execution of instructions to be executed by processor 2304. System 2300 further includes a read only memory (ROM) 2308 or other static storage device coupled to the bus 2302 for storing static information and instructions for the processor 2304. A storage device 2310, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 2304 can read, is provided and coupled to the bus 2302 for storing information and instructions (e.g., operating systems, applications programs and the like).

System 2300 may be coupled via the bus 2302 to a display 2312, such as a flat panel display, for displaying information to a user. An input device 2314, such as a keyboard including alphanumeric and other keys, may be coupled to the bus 2302 for communicating information and command selections to the processor 2304. Another type of user input device is cursor control device 2316, such as a mouse, a trackball, or cursor direction keys for communicating direction information and command selections to processor 2304 and for controlling cursor movement on the display 2312. Other user interface devices, such as microphones, speakers, etc. are not shown in detail but may be involved with the receipt of user input and/or presentation of output.

The processes referred to herein may be implemented by processor 2304 executing appropriate sequences of processor-readable instructions stored in main memory 2306. Such instructions may be read into main memory 2306 from another processor-readable medium, such as storage device 2310, and execution of the sequences of instructions contained in the main memory 2306 causes the processor 2304 to perform the associated actions. In alternative embodiments, hard-wired circuitry or firmware-controlled processing units (e.g., field programmable gate arrays) may be used in place of or in combination with processor 2304 and its associated computer software instructions to implement the invention. The processor-readable instructions may be rendered in any computer language.

System 2300 may also include a communication interface 2318 coupled to the bus 2302. Communication interface 2318 may provide a two-way data communication channel with a computer network, which provides connectivity to the plasma processing systems discussed above. For example, communication interface 2318 may be a local area network (LAN) card to provide a data communication connection to a compatible LAN, which itself is communicatively coupled to other computer systems. The precise details of such communication paths are not critical to the present invention. What is important is that system 2300 can send and receive messages and data through the communication interface 2318 and in that way communicate with other controllers, etc.

Thus, methods and systems for characterizing computing system performance using peer-derived performance severity and symptom severity models have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
    for each of a plurality of measurement intervals and for each of a plurality of computing systems,
        determining operation information describing a plurality of operations that are executed over the measurement interval by the computing system, wherein the plurality of operations are characterized by a plurality of operation sizes and a plurality of operation types, and wherein the operation information includes an operation count and an average operation latency for each group of the operations that share a common operation size and a common operation type;
        receiving performance characteristics describing a state of the computing system during the measurement interval, the performance characteristics comprising a plurality of performance characteristic types;
        generating correlation data comprising groupings of elements of the operation information and the performance characteristics that share a common measurement interval and relate to a common computing system;
        generating a plurality of symptom models based on the correlation data, wherein each symptom model of the plurality of symptom models is associated with a different combination of an operation type and a performance characteristic type, wherein the plurality of operation types comprises different types of input/output (I/O) operations of the computing system, and wherein the plurality of operation types includes at least one type of read operation;
    executing a diagnostic model using a plurality of outputs of the plurality of symptom models; and
    generating, based on an execution of the diagnostic model, a diagnosis for the computing system.

2. The method of claim 1, further comprising:
    for each of the plurality of measurement intervals and for each of the plurality of computing systems,
        determining whether one or more of the operation types are representative of a workload of the computing system over the measurement interval;
        if so, storing the one or more representative operation types with the interval identifier and the system identifier in the correlation data, thereby forming a correspondence between the representative operation types and the performance characteristics that relate to a common measurement interval and a common computing system.

3. The method of claim 1, further comprising:
    for each of the plurality of measurement intervals, for each the plurality of computing systems, and for each of the plurality of operation types, determining a peer performance score for the operations with the operation type, wherein the peer performance score is based on the operation information for the operations with the operation type and a peer performance model constructed for the operation type; and
    for each of the plurality of measurement intervals, and the plurality of computing systems, storing the peer performance scores corresponding to each of the operation types with the interval identifier and the system identifier in the correlation data, thereby forming a correspondence between the peer performance scores and the performance characteristics that relate to a common measurement interval and a common computing system.

4. The method of claim 1, comprising, for each combination of operation type and performance characteristic type:
    determining whether a bifurcation is present in the correlation data of the combination of operation type and performance characteristic type; and
    in response to a determination that the bifurcation is present in the correlation data, generating a symptom model for the particular combination of operation type and performance characteristic type.

5. The method of claim 3, wherein each of the peer performance models comprises a plurality of latency distributions, each of the latency distributions is formed by aggregating average latency measurements from the computing systems, and the average latency measurements correspond to operations having a common operation size and a common operation type.

6. The method of claim 1, wherein the performance characteristic types include at least one of a non-sequential cache miss percentage, a prefetch miss percentage, a CPU busy percentage, a hard disk drive busy percentage, a solid state drive busy percentage, or a sequential cache miss percentage.

7. The method of claim 2, further comprising:
    for at least one of the measurement intervals with at least one representative operation type and for at least one of the computing systems, determining a symptom severity score based on a first performance characteristic of the computing system during the measurement interval, wherein determining the symptom severity score comprises:
- selecting a symptom model of the plurality of symptom models corresponding to a first one of the at least one representative operation types of the measurement interval and a first type of the first performance characteristic; and
- applying the selected symptom model to the first performance characteristic.

8. The method of claim 7, wherein the selected symptom model comprises one or more of the following:
- a threshold which separates (i) a peak of a first conditional probability distribution of performance characteristic values of the first performance characteristic type conditioned upon the performance characteristic values being associated with poor performance from (ii) a peak of a second conditional probability distribution of performance characteristic values of the first performance characteristic type conditioned upon the performance characteristic values being associated with normal performance;
- a linear best fit line for a scatter plot which plots pairings of performance characteristic values and peer performance scores for the first representative operation type;
- a non-linear best fit line for a scatter plot which plots pairings of performance characteristic values and peer performance scores for the first representative operation type;
- a conditional probability distribution of poor performance of the computing system given a performance characteristic value; and
- a conditional probability distribution of normal performance of the computing system given a performance characteristic value.

9. An analysis server, comprising:
a processor;
a memory communicatively coupled to the processor; and
a set of instructions on the memory that, when executed by the processor, cause the processor to, for each of a plurality of measurement intervals and for each of a plurality of computing systems,
- determine operation information describing a plurality of operations that are executed over the measurement interval by the computing system, wherein the plurality of operations are characterized by a plurality of operation sizes and a plurality of operation types, and wherein the operation information includes an operation count and an average operation latency for each group of the operations that share a common operation size and a common operation type;
- receive performance characteristics describing a state of the computing system during the measurement interval, the performance characteristics comprising a plurality of performance characteristic types;
- generate correlation data comprising groupings of elements of the operation information and the performance characteristics that share a common measurement interval and relate to a common computing system;
- generate a plurality of symptom models based on the correlation data, wherein each symptom model of the plurality of symptom models is associated with a different combination of an operation type and a performance characteristic type, wherein the plurality of operation types comprises different types of input/output (I/O) operations of the computing system, and wherein the plurality of operation types includes at least one type of read operation;
- execute a diagnostic model using a plurality of outputs of the plurality of symptom models; and
- generate, based on an execution of the diagnostic model, a diagnosis for the computing system.

10. The analysis server of claim 9, wherein the set of instructions further cause the processor to, for each of the plurality of measurement intervals and for each of the plurality of computing systems:
- determine whether one or more of the operation types are representative of a workload of the computing system over the measurement interval; and
- if so, store the one or more representative operation types with the interval identifier and the system identifier in the correlation data, thereby forming a correspondence between the representative operation types and the performance characteristics that relate to a common measurement interval and a common computing system.

11. The analysis server of claim 9, wherein the set of instructions further cause the processor to,
- for each of the plurality of measurement intervals, for each the plurality of computing systems, and for each of the plurality of operation types, determine a peer performance score for the operations with the operation type, wherein the peer performance score is based on the operation information for the operations with the operation type and a peer performance model constructed for the operation type; and
- for each of the plurality of measurement intervals, and the plurality of computing systems, store the peer performance scores corresponding to each of the operation types with the interval identifier and the system identifier in the correlation data, thereby forming a correspondence between the peer performance scores and the performance characteristics that relate to a common measurement interval and a common computing system.

12. The analysis server of claim 9, wherein the set of instructions further cause the processor to, for each combination of operation type and performance characteristic type:
- in response to a determination that the bifurcation is present in the correlation data, generating a symptom model for the particular combination of operation type and performance characteristic type.

13. The analysis server of claim 11, wherein each of the peer performance models comprises a plurality of latency distributions, each of the latency distributions is formed by aggregating average latency measurements from the computing systems, and the average latency measurements correspond to operations having a common operation size and a common operation type.

14. The analysis server of claim 9, wherein the performance characteristic types include at least one of a non-sequential cache miss percentage, a prefetch miss percentage, a CPU busy percentage, a hard disk drive busy percentage, a solid state drive busy percentage, or a sequential cache miss percentage.

15. The analysis server of claim 10, wherein the instructions further cause the processor to, for at least one of the measurement intervals with at least one representative operation type and for at least one of the computing systems, determine a symptom severity score based on a first performance characteristic of the computing system during the measurement interval, wherein the instructions to determine the symptom severity score comprise instructions to:
  select a symptom model of the plurality of symptom models corresponding to one of the at least one representative operation types of the measurement interval and a type of the first performance characteristic; and
  apply the selected symptom model to the first performance characteristic.

16. A non-transitory machine-readable storage medium comprising software instructions that, when executed by a processor of an analysis server, cause the processor to, for each of a plurality of measurement intervals and for each of a plurality of computing systems:
  determine operation information describing a plurality of operations that are executed over the measurement interval by the computing system, wherein the plurality of operations are characterized by a plurality of operation sizes and a plurality of operation types, and wherein the operation information includes an operation count and an average operation latency for each group of the operations that share a common operation size and a common operation type;
  receive performance characteristics describing a state of the computing system during the measurement interval, the performance characteristics comprising a plurality of performance characteristic types; and
  generate correlation data comprising groupings of elements of the operation information and the performance characteristics that share a common measurement interval and relate to a common computing system;
  generate a plurality of symptom models based on the correlation data, wherein each symptom model of the plurality of symptom models is associated with a different combination of an operation type and a performance characteristic type, wherein the plurality of operation types comprises different types of input/output (I/O) operations of the computing system, and wherein the plurality of operation types includes at least one type of read operation;
  execute a diagnostic model using a plurality of outputs of the plurality of symptom models; and
  generate, based on an execution of the diagnostic model, a diagnosis for the computing system.

17. The non-transitory machine-readable storage medium of claim 16, wherein the software instructions further cause the processor to, for each of the plurality of measurement intervals and for each of the plurality of computing systems:
  determine whether one or more of the operation types are representative of a workload of the computing system over the measurement interval; and
  if so, store the one or more representative operation types with the interval identifier and the system identifier in the correlation data, thereby forming a correspondence between the representative operation types and the performance characteristics that relate to a common measurement interval and a common computing system.

18. The non-transitory machine-readable storage medium of claim 16, wherein the software instructions further cause the processor to:
  for each of the plurality of measurement intervals, for each the plurality of computing systems, and for each of the plurality of operation types, determine a peer performance score for the operations with the operation type, wherein the peer performance score is based on the operation information for the operations with the operation type and a peer performance model constructed for the operation type; and
  for each of the plurality of measurement intervals, and the plurality of computing systems, store the peer performance scores corresponding to each of the operation types with the interval identifier and the system identifier in the correlation data, thereby forming a correspondence between the peer performance scores and the performance characteristics that relate to a common measurement interval and a common computing system.

19. The non-transitory machine-readable storage medium of claim 16, wherein the set of instructions further cause the processor to, for each combination of operation type and performance characteristic type:
  in response to a determination that the bifurcation is present in the correlation data, generating a symptom model for the particular combination of operation type and performance characteristic type.

20. The non-transitory machine-readable storage medium of claim 18, wherein each of the peer performance models comprises a plurality of latency distributions, each of the latency distributions is formed by aggregating average latency measurements from the computing systems, and the average latency measurements correspond to operations having a common operation size and a common operation type.

21. The non-transitory machine-readable storage medium of claim 16, wherein the performance characteristic types include at least one of a non-sequential cache miss percentage, a prefetch miss percentage, a CPU busy percentage, a hard disk drive busy percentage, a solid state drive busy percentage, or a sequential cache miss percentage.

* * * * *